US009044834B2

(12) United States Patent  
Zakotnik et al.

(10) Patent No.: US 9,044,834 B2  
(45) Date of Patent: Jun. 2, 2015

(54) MAGNET RECYCLING TO CREATE Nd—Fe—B MAGNETS WITH IMPROVED OR RESTORED MAGNETIC PERFORMANCE

(71) Applicants: Miha Zakotnik, Newark (DE); Peter Afiuny, Perryville, MD (US); Scott Dunn, Perryville, MD (US); Catalina Oana Tudor, Newark, DE (US)

(72) Inventors: Miha Zakotnik, Newark (DE); Peter Afiuny, Perryville, MD (US); Scott Dunn, Perryville, MD (US); Catalina Oana Tudor, Newark, DE (US)

(73) Assignee: Urban Mining Technology Company, Perryville, MD (US)

( * ) Notice: Subject to any disclaimer, the term of this patent is extended or adjusted under 35 U.S.C. 154(b) by 0 days.

(21) Appl. No.: 14/307,267

(22) Filed: Jun. 17, 2014

(65) Prior Publication Data

US 2014/0369881 A1 Dec. 18, 2014

Related U.S. Application Data

(60) Provisional application No. 61/835,897, filed on Jun. 17, 2013, provisional application No. 61/921,845, filed on Dec. 30, 2013.

(51) Int. Cl.
*H01F 1/053* (2006.01)
*H01F 1/057* (2006.01)
(Continued)

(52) U.S. Cl.
CPC .............. *B23P 19/04* (2013.01); *H01F 1/0577* (2013.01); *H01F 1/086* (2013.01);
(Continued)

(58) Field of Classification Search
CPC .............. B22F 9/04; B22F 3/02; B22F 9/023; B22F 2202/05; B22F 3/10; H01F 1/0577; H01F 1/0573; H01F 41/0266; H01F 1/0571; H01F 41/0273; C22C 38/005
USPC ....................................... 148/105
See application file for complete search history.

(56) References Cited

U.S. PATENT DOCUMENTS 3,802,935 A * 4/1974 Martin et al. ................. 148/103
4,043,019 A 8/1977 Schroder
(Continued)

FOREIGN PATENT DOCUMENTS

CN 101051544 A 10/2007
CN 101246771 A 8/2008
(Continued)

OTHER PUBLICATIONS

Machine translation of DE19843883C1, Oct. 1999.*
(Continued)

*Primary Examiner* — Jie Yang
*Assistant Examiner* — Xiaowei Su
(74) *Attorney, Agent, or Firm* — Fish & Richardson P.C.

(57) ABSTRACT

Methods, systems, and apparatus, including computer programs encoded on computer storage media, for recycling magnetic material to restore or improve the magnetic performance. One of the methods includes demagnetizing magnetic material from a waste magnet assembly by cyclic heating and cooling of the magnetic material, fragmenting adhesives attached to the magnetic material, cracking coating layers of the magnetic material, and subjecting the magnetic material to at least one of: a) a mechanical treatment or b) a chemical treatment, to remove the coating layers and prepare the magnetic material without impurities, fragmenting the demagnetized magnetic material to form a powder, and mixing the powder with a rare earth material R and an elemental additive A to produce a homogeneous powder, wherein the rare earth material R comprises at least one of: Nd or Pr, and the elemental additive A comprises at least one of: Nd, Pr, Dy, Co, Cu, and Fe.

27 Claims, 15 Drawing Sheets

(51) Int. Cl.

| | | |
|---|---|---|
| *B23P 19/04* | (2006.01) | |
| *H01F 1/08* | (2006.01) | |
| *H01F 41/02* | (2006.01) | |
| *H01F 41/00* | (2006.01) | |
| *B01J 10/00* | (2006.01) | |
| *B22F 1/00* | (2006.01) | |
| *B22F 9/04* | (2006.01) | |

(52) U.S. Cl.
CPC ......... *H01F 41/0266* (2013.01); *H01F 1/0573* (2013.01); *H01F 41/0253* (2013.01); *H01F 41/00* (2013.01); *B01J 10/005* (2013.01); *B22F 1/0088* (2013.01); *B22F 9/04* (2013.01); *H01F 1/057* (2013.01)

(56) References Cited

U.S. PATENT DOCUMENTS

| | | | |
|---|---|---|---|
| 4,333,219 A | 6/1982 | Ginatta | |
| 4,597,938 A | 7/1986 | Matsuura et al. | |
| 4,601,875 A | 7/1986 | Yamamoto et al. | |
| 4,770,723 A | 9/1988 | Sagawa et al. | |
| 4,792,368 A | 12/1988 | Sagawa et al. | |
| 4,826,546 A | 5/1989 | Yamamoto et al. | |
| 4,859,255 A | 8/1989 | Fujimura et al. | |
| 4,900,374 A | 2/1990 | Panchanathan | |
| 4,981,532 A | 1/1991 | Takeshita et al. | |
| 5,000,800 A | 3/1991 | Sagawa | |
| 5,049,208 A | 9/1991 | Yajima et al. | |
| 5,143,560 A | 9/1992 | Doser | |
| 5,183,516 A | 2/1993 | Sagawa et al. | |
| 5,192,372 A | 3/1993 | Fujimura et al. | |
| 5,194,098 A | 3/1993 | Sagawa et al. | |
| 5,200,001 A | 4/1993 | Hirosawa et al. | |
| 5,209,789 A | 5/1993 | Yoneyama et al. | |
| 5,217,543 A | 6/1993 | Inokoshi | |
| 5,228,930 A | 7/1993 | Nakayama et al. | |
| 5,230,749 A | 7/1993 | Fujimura et al. | |
| 5,281,250 A | 1/1994 | Hamamura et al. | |
| 5,338,371 A | 8/1994 | Nakayama et al. | |
| 5,338,372 A | 8/1994 | Tabaru | |
| 5,377,920 A | 1/1995 | Alavi et al. | |
| 5,387,291 A | 2/1995 | Kaneko et al. | |
| 5,417,773 A | 5/1995 | Nakayama et al. | |
| 5,431,747 A | 7/1995 | Takebuchi et al. | |
| 5,437,709 A | 8/1995 | Ellis et al. | |
| 5,454,998 A | 10/1995 | Bogatin et al. | |
| 5,466,308 A | 11/1995 | Fujimura et al. | |
| 5,472,525 A | 12/1995 | Tokunaga et al. | |
| 5,486,224 A | 1/1996 | Kishimoto et al. | |
| 5,486,239 A | 1/1996 | Nakayama et al. | |
| 5,505,794 A | 4/1996 | Nakayama et al. | |
| 5,527,504 A | 6/1996 | Kishimoto et al. | |
| 5,565,043 A | 10/1996 | Akioka et al. | |
| 5,666,635 A | 9/1997 | Kaneko et al. | |
| 5,788,782 A | 8/1998 | Kaneko et al. | |
| 5,851,312 A | 12/1998 | Honkura et al. | |
| 5,858,123 A | 1/1999 | Uchida et al. | |
| 5,997,804 A | 12/1999 | Uchida et al. | |
| 6,080,245 A | 6/2000 | Uchida et al. | |
| 6,113,846 A | 9/2000 | Honkura et al. | |
| 6,149,861 A | 11/2000 | Kaneko et al. | |
| 6,159,308 A | 12/2000 | Uchida et al. | |
| 6,247,660 B1 | 6/2001 | Imai et al. | |
| 6,399,150 B1 | 6/2002 | Yoshimura et al. | |
| 6,403,024 B1 | 6/2002 | Oota et al. | |
| 6,444,052 B1 | 9/2002 | Honkura et al. | |
| 6,447,621 B1 | 9/2002 | Tokoro et al. | |
| 6,461,565 B2 | 10/2002 | Tokuhara et al. | |
| 6,468,365 B1 | 10/2002 | Uchida et al. | |
| 6,474,576 B1 | 11/2002 | Oota et al. | |
| 6,491,765 B2 | 12/2002 | Okayama et al. | |
| 6,511,552 B1 | 1/2003 | Makita et al. | |
| 6,527,874 B2 | 3/2003 | Li | |
| 6,533,837 B1 | 3/2003 | Yamagata et al. | |
| 6,537,345 B1 | 3/2003 | Terada et al. | |
| 6,537,385 B2 | 3/2003 | Okayama et al. | |
| 6,599,450 B1 | 7/2003 | Terada et al. | |
| 6,602,352 B2 | 8/2003 | Okumura et al. | |
| 6,635,120 B2 | 10/2003 | Tokoro et al. | |
| 6,648,984 B2 | 11/2003 | Takaki et al. | |
| 6,676,773 B2 | 1/2004 | Kaneko et al. | |
| 6,695,929 B2 | 2/2004 | Kanekiyo et al. | |
| 6,736,343 B2 | 5/2004 | Oota et al. | |
| 6,752,879 B2 | 6/2004 | Takaki et al. | |
| 6,756,010 B2 | 6/2004 | Harada et al. | |
| 7,004,228 B2 | 2/2006 | Murakami et al. | |
| 7,014,440 B2 | 3/2006 | Okumura et al. | |
| 7,018,485 B2 | 3/2006 | Tsujimoto et al. | |
| 7,037,465 B2 | 5/2006 | Ogawa et al. | |
| 7,040,969 B1 | 5/2006 | Chikuba et al. | |
| 7,045,092 B2 | 5/2006 | Ogawa et al. | |
| 7,045,093 B2 | 5/2006 | Tanaka et al. | |
| 7,048,808 B2 | 5/2006 | Kaneko et al. | |
| 7,056,393 B2 | 6/2006 | Tokuhara et al. | |
| 7,086,934 B2 | 8/2006 | Tochishita et al. | |
| 7,138,017 B2 | 11/2006 | Kaneko et al. | |
| 7,138,018 B2 | 11/2006 | Honkura et al. | |
| 7,163,591 B2 | 1/2007 | Kim et al. | |
| 7,204,891 B2 | 4/2007 | Hirota et al. | |
| 7,244,318 B2 | 7/2007 | Sekino et al. | |
| 7,258,751 B2 | 8/2007 | Tomizawa et al. | |
| 7,344,606 B2 | 3/2008 | Mino et al. | |
| 7,390,369 B2 | 6/2008 | Odaka et al. | |
| 7,507,302 B2 | 3/2009 | Miyoshi et al. | |
| 7,578,892 B2 | 8/2009 | Hirosawa et al. | |
| 7,585,378 B2 | 9/2009 | Odaka et al. | |
| 7,670,443 B2 | 3/2010 | Kogure et al. | |
| 7,740,715 B2 | 6/2010 | Tomizawa | |
| 7,789,933 B2 | 9/2010 | Tomizawa | |
| 7,842,140 B2 | 11/2010 | Kanekiyo et al. | |
| 7,922,832 B2 | 4/2011 | Nakamura et al. | |
| 7,955,443 B2 | 6/2011 | Nakamura et al. | |
| 7,972,448 B2 | 7/2011 | Reppel | |
| 8,075,707 B2 | 12/2011 | Nakamura et al. | |
| 8,128,758 B2 | 3/2012 | Nozawa et al. | |
| 8,287,661 B2 | 10/2012 | Ishii et al. | |
| 8,317,941 B2 | 11/2012 | Kuniyoshi et al. | |
| 8,361,242 B2 | 1/2013 | Blank et al. | |
| 2002/0112785 A1 | 8/2002 | Sekine et al. | |
| 2002/0129874 A1 | 9/2002 | Kaneko et al. | |
| 2002/0197180 A1 | 12/2002 | Tokuhara et al. | |
| 2003/0084964 A1 | 5/2003 | Okayama et al. | |
| 2004/0031543 A1 | 2/2004 | Hirosawa et al. | |
| 2004/0206423 A1 | 10/2004 | Harada et al. | |
| 2004/0231751 A1 | 11/2004 | Kuniyoshi et al. | |
| 2005/0268989 A1 | 12/2005 | Tomizawa et al. | |
| 2006/0016515 A1 | 1/2006 | Tomizawa et al. | |
| 2006/0162821 A1 | 7/2006 | Reppel | |
| 2007/0034299 A1 | 2/2007 | Machida et al. | |
| 2007/0240790 A1 | 10/2007 | Kita et al. | |
| 2010/0247367 A1 | 9/2010 | Nakamura et al. | |
| 2011/0052799 A1* | 3/2011 | Nagata et al. ................. 427/127 |
| 2011/0076128 A1 | 3/2011 | Johnsen et al. | |
| 2012/0021221 A1 | 1/2012 | Miyoshi | |
| 2012/0066880 A1 | 3/2012 | Eggleston et al. | |
| 2012/0125155 A1 | 5/2012 | Nakayama et al. | |
| 2012/0137829 A1 | 6/2012 | Harris et al. | |
| 2012/0138539 A1 | 6/2012 | Cogliandro | |
| 2013/0011293 A1 | 1/2013 | Mochizuki | |
| 2013/0039797 A1 | 2/2013 | Yuan | |
| 2013/0263699 A1 | 10/2013 | Harris et al. | |
| 2013/0320585 A1 | 12/2013 | Yu et al. | |

FOREIGN PATENT DOCUMENTS

| | | | |
|---|---|---|---|
| CN | 101266855 A | * | 9/2008 |
| CN | 101429030 A | | 5/2009 |
| CN | 101877265 A | | 11/2010 |
| CN | 102211192 A | | 10/2011 |
| CN | 102453804 A | | 5/2012 |
| CN | 103117143 A | | 5/2013 |
| DE | 19843883 | | 10/1999 |
| DE | 19843883 C1 | | 10/1999 |

(56) References Cited

FOREIGN PATENT DOCUMENTS

| GB | 1554384 | | 10/1979 |
|---|---|---|---|
| GB | 2487656 A | | 8/2012 |
| JP | 2004296973 A | * | 10/2004 |
| WO | WO 03/056582 | | 7/2003 |
| WO | WO 2004/101202 | | 11/2004 |
| WO | WO 2012/017574 | | 2/2012 |
| WO | WO2012002774 A3 | | 3/2012 |

OTHER PUBLICATIONS

Machine translation of JP2004-296973A, Oct. 2004.*

Machine translation of Hao, Sep. 2008.*

Asabe et al., "Recycling of Rare Earth Magnet Scraps: Part I Carbon Removal by High Temperature Oxidation ," Materials Transactions, 2001, 42(12):2487-2491.

Burns et al., "Production of Anisotropic Powder from Hot Deformed RE—Fe—B—Cu Alloys," Proceedings of the 16th International Workshop on Rare-Earth Magnets and Their Applications, Japan, 2000, pp. 355-363.

Evans et al., "The hydrogenation behaviour of the phases $Sm_2Co_{17}$ and $Pr_2Co_{17}$," J Material Sci., 1985, 20:817-820.

Harris et al., "Nd-Fe-B Permanent Magnets: Hydrogen Absorption/Desorption Studies (HADS) on $Nd_{16}Fe_{76}B_8$ and $Nd_2Fe_{14}B$," Physica Scripta., 1987, T19:435-440.

Horikawa et al., "Magnetic properties of the Nd—Fe—B sintered magnet powders recovered by Yb metal vapor sorption ," J Magnetism and Magnetic Materials, 2004, 271:369-380.

Kawasaki et al., "Reproduction of Nd_Fe_B Sintered Magnet Scraps Using a Binary Alloy Blending Technique," Materials Transactions, 2003, 44(9):1682-1685.

Kianvash and Hans, "Metallographic studies of a 2-17-Type Sm(Co, Cu, Fe, Zr)$_{8.92}$ magnetic alloy," J Less Common Metals, 1984, 98:93-108.

Kianvash and Harris, "Hydrogen decrepitation as a method of powder preparation of a 2:17-type, Sm(Co,Cu, Fe, Zr)$_{8.92}$ magnetic alloy," J Material Sci., 1985, 20:682.

Kwon et al., "Coervicity Enhancement in Nd—Fe—B Powder Obtained from Crushed Sintered Magnets," Proceedings of the 18th International Workshop on HPMA (France), 2004, 8 pages.

Larsen and Liversay, "Hydriding kinetics of $SmCo_5$," J Less Common Metals, 1980, 73:79-88.

Machida et al., "Effective Recovery of Nd—Fe—B Sintered Magnet Scrap Powders as Microwave Absorbing Materials," Chem Lett., 2003, 32:658-659.

Namkung et al., "Coercivity of Anisotropic Magnet Powder Obtained from the Nd—Fe—B Sintered Magnet Scrap," Proceedings of the 18th International Workshop on HPMA (France), 2004, 5 pages.

Raichlen and Doremus, "Kinetics of Hydriding and Allotropic Transformation in $SmCo_5$," J Applied Physics, 1971, 42:3166-3170.

Rivoirard et al., "Anisotropic and coercive MdFeB powder for bonded magnets," Proceedings of the 16th International Workshop on Rare-Earth Magnets and Their Applications (Sendai Japan), 2000, pp. 347-354.

Saguci et al., "Recycling of Rare Earth Magnet Scraps Part III Carbon Removal from Nd Magnet Grinding Sludge under Vacuum Heating," Materials Transactions, 2002, 43:256-260.

Saguci et al., "Recycling of rare earth magnet scraps: Carbon and oxygen removal from Nd magnet scraps," J Alloys Compounds, 2006, 408-412:1377-1381.

Saito et al., "The Extraction of Sm from Sm—Co alloys by the Glass Slag Method," Materials Transactions, 2003, 44:637-640.

Sugimoto et al., "GHz microwave absorption of a fine α—Fe structure produced by the disproportionation of $Sm_2Fe_{17}$ in hydrogen ," J Alloy Compounds, 2000, 330-332:301-306.

Suzuki et al., "Recycling of Rare Earth Magnet Scraps: Part II Oxygen Removal by Calcium," Materials Transactions, 2001, 42:2492-2498.

Uda, "Recovery of Rare Earths from Magnet Sludge by $FeCl_2$," Materials Transactions, 2002, 43:55-62.

Yamashita et al., "Characteristics of Epoxy Resin Bonded Magnets Prepared from Recycled Nd—Fe—B Based Melt-Spun Powder," Proceedings of the 16th International Workshop on Rare-Earth Magnets and Their Applications (Sendai Japan), 2000, pp. 695-703.

Zakotnik et al., "Hydrogen Decrepitation and Recycling of Sintered NdFeB-type Sintered Magnets," Proceedings of 19th International Workshop on Rare Earth Permanent Magnets & Their Applciations, Sep. 2004, pp. 289-295.

Zakotnik et al., "Multiple recycling of NdFeB-type sintered magnets," J Alloys and Compounds, Feb. 5, 2009, 469(1-2):314-321.

Zakotnik et al., "Possible methods of recycling NdFeB-type sintered magnets using the HD/degassing process," J Alloys and Compounds, 2008, 450(1-2):525-531.

Zakotnik et al., "Possible Methods of Recycling NdFeB-Type Sintered Magnets Using the HD/Degassing or HDDR Processes," Proceedings of the 18th International Workshop on HPMA (Grenoble, France), 2004, 8 pages.

Merrow, E.W., 1988. Estimating startup times for solids-processing plants. Chem. Eng. 24, pp. 89-92.

"ASM Alloy Phase Diagram Database—How to use Explore, Search and Tools", ASM International, http://www1.asminternational.org/asmenterprise/apd/help/HowToSearch.aspx (accessed on Nov. 10, 2014), 2 pages.

Suk-Joong L. Kang, "Sintering: Densification, Grain Growth, & Microstructure," Elsevier, 2005, 19 pages.

Deborah C. Blaine, et al., "Master Sintering Curve Concepts as Applied to the Sintering of Molybdenum," Metallurgical and Materials Transactions A, vol. 37a, Mar. 2006.

Notification of Transmittal of the International Search Report and the Written Opinion of the International Searching Authority, or the Declaration, mailed Dec. 23, 2014 for corresponding International Patent Application No. PCT/US2014/042805, 10 pages.

Non-final Office Action dated Nov. 6, 2014 from related U.S. Appl. No. 14/448,823, 18 pages.

Non-final Office Action dated Jan. 23, 2015 from U.S. Appl. No. 14/543,210, 20 pages.

Non-final Office Action dated Feb. 25, 2015 from U.S. Appl. No. 14/543,296, 27 pages.

Blank, "What determines the demagnetization in Nd—Fe—B magnets?", Journal of Magnetism and Magnetic Materials 101 (1991), pp. 317-322.

Sagawa et al., "Dependence of coercivity on the anisotropy field in the Nd2Fe1 4B-type sintered magnets", Journal of Applied Physics 61, 3559 (1987); doi: 10.1063/1.338725.

Sagawa and Hirosawa, "Coercivity and Microsructure of R—Fe—B Sintered Permanent Magnets", Journal de Physique Colloques, 1988, 49 (C8), pp. C8-617-C8-622.

Adler, "A Contribution to the Understanding of Coercivity and Its Temperature Dependence in Sintered SmCo5 and Nd2Fe14B Magnets", 4th International Symposium on Magnetic Anisotropy and Coercivity in Rare Earth-Transition Metal Alloys, Dayton, Ohio, May 9, 1985, 14 pages.

Binnemans et al., "Recycling of rare earths: a critical review", Journal of Cleaner Production 51 (2013), pp. 1-22.

Zakotnik et al., "Kinetic studies of hydrogen desorption in SmCo 2/17-type sintered magnets", Thermochimica Acta 486 (2009), pp. 41-45.

Zakotnik et al., "Hydrogen decrepitation of a 2/17 sintered magnet at room temperature", Journal of Alloys and Compounds 450 (2008), pp. L1-L3.

Sheridan et al., "Anisotropic powder from sintered NdFeB magnets by the HDDR processing route", Journal of Magnetism and Magnetic Materials 324 (2012), pp. 63-67.

Sprecher et al., "Life Cycle Inventory of the Production of Rare Earths and the Subsequent Production of NdFeB Rare Earth Permanent Magnets", Environ. Sci. Technol., 2014, vol. 48, pp. 3951-3958.

Walton, "Rare earth recovery", Materials World, vol. 19, No. 8, Aug. 2011, 4 pages.

* cited by examiner

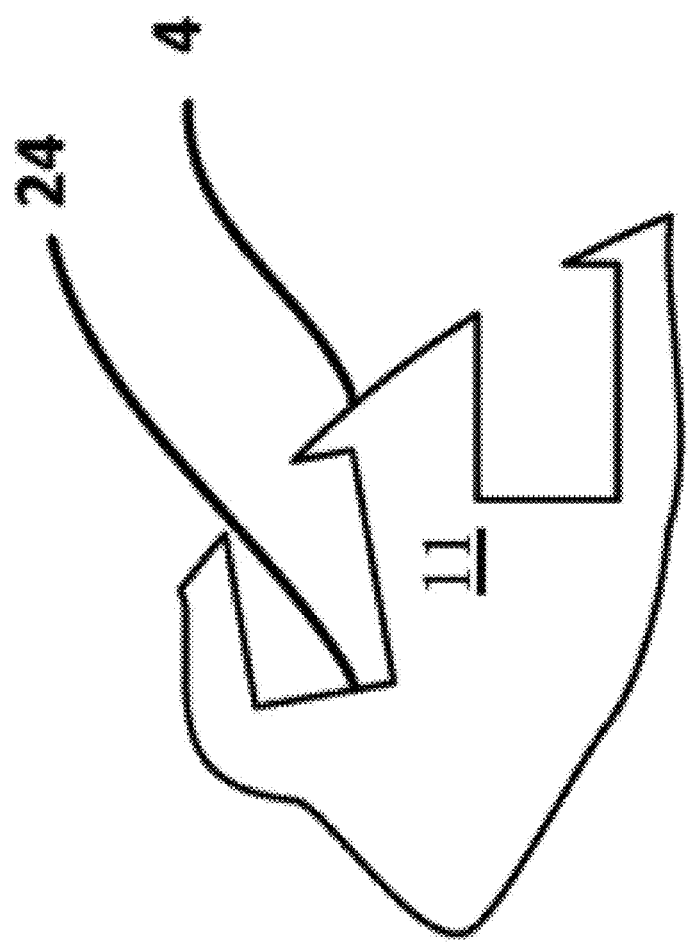

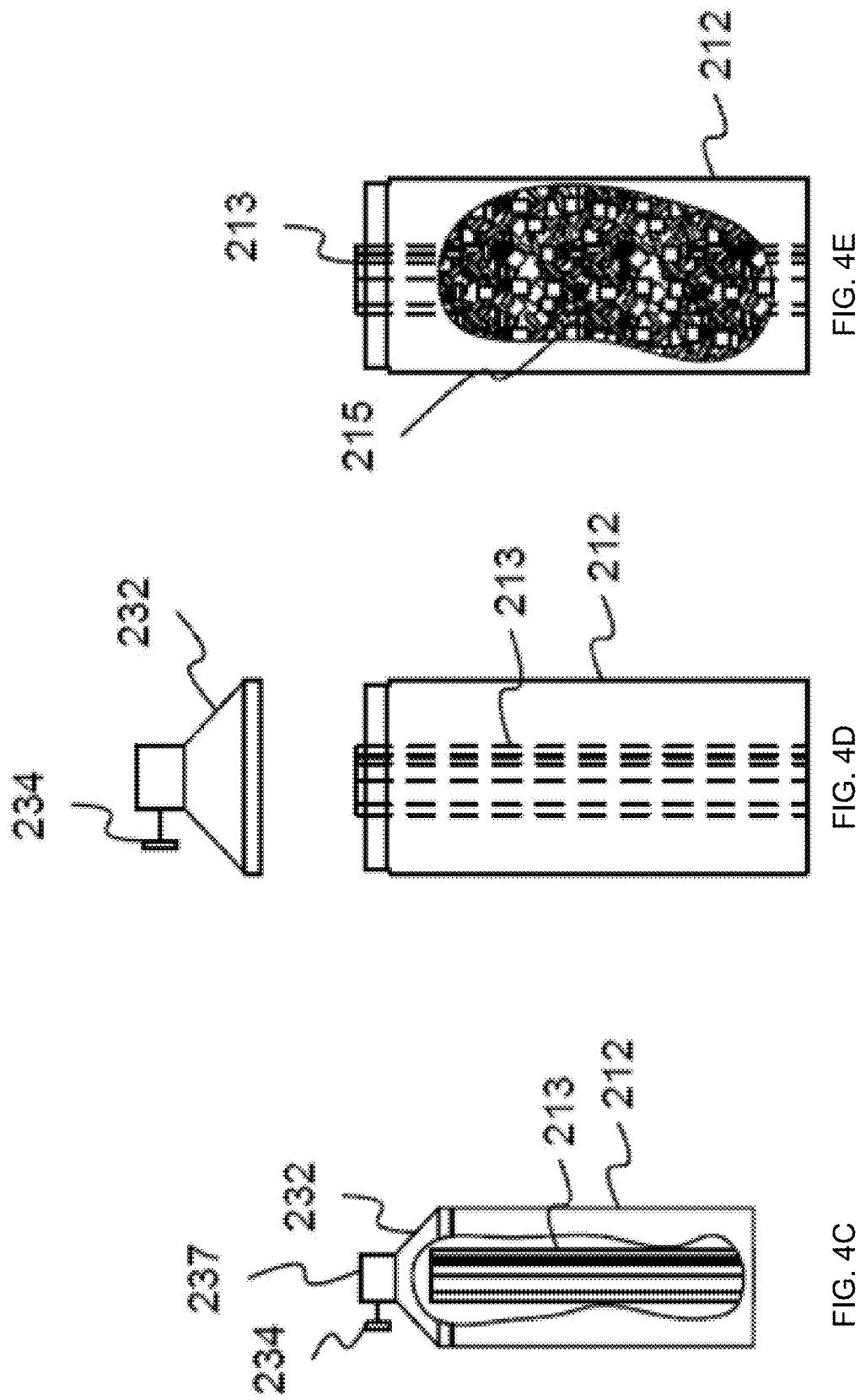

MAGNET RECYCLING TO CREATE Nd—FE—B MAGNETS WITH IMPROVED OR RESTORED MAGNETIC PERFORMANCE

BACKGROUND

The present disclosure relates to the manufacture of a Neodymium-Iron-Boron (Nd—Fe—B) sintered magnet from waste magnetic material.

The global market for Rare Earth Permanent Magnets (REPM) is growing together with the range of REPM applications. REPM's exhibit high magnetic performance characteristics, and are used in the development of high-tech, high-efficiency applications in many industries including electronics, energy, transportation, aerospace, defense, medical devices, and information and communication technology.

For example, applications using the Nd—Fe—B permanent magnets include: starter motors, anti-lock braking systems (ABS), fuel-pumps, fans, loudspeakers, microphones, telephone ringers, switches, relays, hard-disk drives (HDD), stepper motors, servo-motors, magnetic resonance imaging (MRI), windmill generators, robotics, sensors, magnetic separators, guidance systems, satellites, cruise missiles, and so on.

The Nd—Fe—B type sintered magnet has a very fine tuned elemental composition, which includes, besides Nd, elements like Dy, Tb, Ga, Co, Cu, Al and other minor transitional metal elemental additions.

SUMMARY

In general, one innovative aspect of the subject matter described in this specification can be embodied in methods that include the actions of demagnetizing magnetic material from a waste magnet assembly by cyclic heating and cooling of the magnetic material, fragmenting adhesives attached to the magnetic material, cracking coating layers of the magnetic material, and subjecting the magnetic material to at least one of: a) a mechanical treatment or b) a chemical treatment, to remove the coating layers and prepare the magnetic material without impurities, fragmenting the demagnetized magnetic material to form a powder, and mixing the powder with a) a rare earth material R and b) an elemental additive A to produce a homogeneous powder, wherein the rare earth material R may include at least one of: a) Nd or b) Pr, and the elemental additive A may include at least one of: a) Nd, b) Pr, c) Dy, d) Co, e) Cu, and f) Fe. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include performing the fragmenting and the mixing concurrently. Fragmenting the demagnetized magnetic material may include fragmenting the demagnetized magnetic material to an average particle size between 1 to 4 µm. Fragmenting the demagnetized magnetic material may include removing particles with a particle fraction of size bigger than an average size of particles in the demagnetized magnetic material from the demagnetized magnetic material to obtain a low oxygen concentration in the demagnetized magnetic material. Removing, from the demagnetized magnetic material, particles with the particle fraction of size bigger than the average size of particles in the demagnetized magnetic material to obtain a low oxygen concentration in the demagnetized magnetic material may include sieving.

In some implementations, the method includes mixing the homogenous powder with another element selected from the rare earth material R or the elemental additive A. The method may include subjecting the magnetic material to at least one of: a) a mechanical treatment or b) a chemical treatment, to remove the coating layers and prepare the magnetic material without impurities. The method may include harvesting the magnetic material from one or more magnet assemblies by separating a waste magnet part from a non-magnet part included in the magnet assemblies, and extracting the waste magnet part from the non-magnet part. Fragmenting the demagnetized magnetic material to form the powder may include fragmenting the demagnetized magnetic material to form the powder with an average particle size between about 1 micron to about 2 millimeters. The method may include further fragmenting the powder to an average particle size between about 1 to about 4 microns, and homogenizing the powder. Homogenizing the powder may include homogenizing the powder that may include an average particle size between about 1 micro to about 2 millimeters, and mixing the powder with a) the rare earth material R and b) the elemental additive A to produce the homogeneous powder may include mixing the powder with an average particle size between about 1 to about 4 micros with a) the rare earth material R and b) the elemental additive A to produce the homogenous powder. Mixing the powder with a) the rare earth material R and b) the elemental additive A to produce the homogeneous powder may include mixing the powder with an average particle size between about 1 micron to about 2 millimeters with a) the rare earth material R and b) the elemental additive A to produce the homogenous powder, and homogenizing the powder may include homogenizing the powder that may include an average particle size between about 1 to about 4 microns.

In some implementations, the method includes fragmenting the rare earth material R and the elemental additive A separately from fragmenting the demagnetized magnetic material to form the powder, wherein mixing the powder with a) the rare earth material R and b) the elemental additive A to produce the homogeneous powder may include mixing the powder with a) the fragmented rare earth material R and b) the fragmented elemental additive A to produce the homogeneous powder.

In some implementations, the method may include sintering and magnetizing the homogenous powder to form a recycled Nd—Fe—B magnetic product with a remanence and a coercivity at least the same as a waste magnet part from the waste magnet assembly. Sintering and magnetizing the homogenous powder to form a recycled Nd—Fe—B magnetic product may include compacting the homogenous powder to form a green compact, sintering the green compact between about 1000° C. to about 1100° C., and magnetizing the sintered green compact to an inert atmosphere below 15° C. to form the recycled Nd—Fe—B magnetic product. The method may include heat treating the sintered green compact between about 490° C. to about 950° C. prior to magnetizing the sintered green compact. The method may include exposing the green compact to an inert magnetic field below 15° C.

An atomic percentage of Co in the recycled Nd—Fe—B magnetic product may be less than or equal to 3%. An atomic percentage of Cu in the recycled Nd—Fe—B magnetic product may be less than or equal to 0.3%. A combined atomic percentage of Fe and Co in the recycled Nd—Fe—B magnetic product may be less than or equal to 77%. A combined atomic percentage of Nd, Pr, and Dy in the recycled Nd—Fe—B magnetic product may be greater than or equal to a combined atomic percentage of Nd, Pr, and Dy in a waste magnet part from the waste magnet assembly. A combined atomic percentage of Nd, Dy, and Pr in the recycled Nd—Fe—B magnetic product may be less than or equal to 18 at. %. The method may include adding a lubricant to the powder prior to compacting the homogenous powder to form the green compact. The coercivity of the recycled Nd—Fe—B magnetic product may be between about 0 to about 20% greater than the coercivity of a waste magnet part from the waste magnet assembly.

In some implementations, the method may include sintering and magnetizing the homogenous powder to form a recycled Nd—Fe—B magnetic product with a final remanence and a final coercivity, wherein the final remanence is about 97% of another remanence of a waste magnet part from the waste magnet assembly and the final coercivity is at least 30% greater than another coercivity of the waste magnet part. The method may include sintering and magnetizing the homogenous powder to form a recycled Nd—Fe—B magnetic product with a final remanence and a final coercivity, wherein the final remanence is about 95% of another remanence of a waste magnet part from the waste magnet assembly and the final coercivity is at least 80% greater than another coercivity of the waste magnet part. The method may include sintering and magnetizing the homogenous powder to form a recycled Nd—Fe—B magnetic product with a final remanence and a final coercivity, wherein the final remanence is about 5% greater than another remanence of a waste magnet part from the waste magnet assembly and the final coercivity is at least the same as another coercivity of the waste magnet part.

In some implementations, the method may include sintering and magnetizing The homogenous powder to form a recycled Nd—Fe—B magnetic product having a composition substantially of $W_aR_bA_c$, where W may include Nd—Fe—B material from the waste magnetic assembly and indices a, b, and c represent atomic percentages of the corresponding compositions or elements. Mixing the powder with a) the rare earth material R and b) the elemental additive A to produce the homogeneous powder may include homogeneously distributing the rare earth material R and the elemental additive A within the demagnetized magnetic material, and sintering and magnetizing the homogenous powder to form a recycled Nd—Fe—B magnetic product may include forming the recycled Nd—Fe—B magnetic product with a concentration of the rare earth material R and a concentration of the elemental additive A that increases, on average, surrounding the primary $Nd_2Fe_{14}B$ phase within the recycled Nd—Fe—B magnetic product. Forming the recycled Nd—Fe—B magnetic product may include restoring, modifying, and improving a concentration and an elemental composition of a grain boundary phase, on average, at a plurality of grain boundary regions that extend throughout the recycled Nd—Fe—B magnetic product. 81≤a≤99.9, 0.1≤b≤19, 3−99.9*a(Co)≤c(Co)≤3−81*a(Co), 0.3−99.9*a(Cu)≤c(Cu)≤0.3−81*a(Cu), 77−99.9*(a(Fe)+a(Co))≤c(Fe)≤77−81*(a(Fe)+a(Co)), a(Nd)+b(Nd)+c(Nd)+a(Pr)+b(Pr)+c(Pr)>0, a(Nd)+b(Nd)+c(Nd)+a(Pr)+b(Pr)+c(Pr)+a(Dy)+b(Dy)+c(Dy)≤18, a(Co)+b(Co)+c(Co)≤3, a(Cu)+b(Cu)+c(Cu)≤0.3, a(Fe)+b(Fe)+c(Fe)+a(Co)+b(Co)+c(Co)≤77, and b(Nd)+c(Nd)+b(Pr)+c(Pr)+b(Dy)+c(Dy)≥0. The atomic percentages of the rare earth material R and the additive material A may satisfy Nd[0.1−19 at. %*s(Nd), x]Pr[0.1−19 at. %*s(Pr), y]Dy[0.1−19 at. %*s(Dy), z]Co[0 at. %, d]Cu[0 at. %, e]Fe[0At. %, f] where [m,n] means a range from minimum m and maximum n; s(t) is the atomic percent of element t in starting composition; f(t) is the atomic percent of element t in final composition; x =18−[81, 99.9] at. %*(s(Nd)+s(Pr)+s(Dy)); y=18−[81,99.9] at. %*(s(Nd)+s(Pr)+s(Dy)); z =18−[81, 99.9] at. %*(s(Nd)+s(Pr)+s(Dy)); d=3−[81, 99.9] at. %*s(Co); e=0.3−[81, 99.9] at. %*s(Cu); and f=77−[81, 99.9] at. %*(s(Fe)+s(Co)).

In some implementations, demagnetizing the magnetic material from the waste magnet assembly by cyclic heating and cooling of the magnetic material may include demagnetizing a waste magnet part from the waste magnet assembly to fragment the adhesives that bond a waste magnet part may include the magnetic material to a non-magnet part and to crack at least one coating layer selected from: an electrolytic black Epoxy, a Ni, a Ni—Cu, a Ni—Ni, a Ni—Cu—Ni, or a Zn coating layer of the waste magnet part. The cyclic heating and cooling may include heating the magnetic material to a Curie temperature of the rare earth material R, and cooling, after to a Curie temperature of the rare earth material R, the magnetic material at a rate of at least 100° C./sec. Mixing the powder may include mixing the powder with at least three elements of: Pr, Nd, Dy, Co, Cu, or Fe. The elemental additive A may include pure Nd. The elemental additive A may include pure Pr. The method may include adding a lubricant to the powder prior to fragmenting the demagnetized magnetic material.

In general, one innovative aspect of the subject matter described in this specification can be embodied in a recycled Nd—Fe—B sintered magnet may include a composition of $W_aR_bA_c$, where waste material W may include material from a waste Nd—Fe—B sintered magnet, rare earth material R may include at least one of: a) Nd or b) Pr, and elemental additives A may include at least one of: a) Nd, b) Pr, c) Dy, d) Co, e) Cu, or f) Fe, and indices a, b, and c indicate atomic percentages of the corresponding compositions or elements and have values satisfying 81≤a≤99.9, 0.1≤b≤19, 3−99.9*a(Co)≤c(Co)≤3−81*a(Co), 0.3−99.9*a(Cu)≤c(Cu)≤0.3−81*a(Cu), 77−99.9*(a(Fe)+a(Co))≤c(Fe)≤77−81*(a(Fe)+a(Co)), a(Nd)+b(Nd)+c(Nd)+a(Pr)+b(Pr)+c(Pr)>0, a(Nd)+b(Nd)+c(Nd)+a(Pr)+b(Pr)+c(Pr)+a(Dy)+b(Dy)+c(Dy)≤18, a(Co)+b(Co)+c(Co)≤3, a(Cu)+b(Cu)+c(Cu)≤0.3, a(Fe)+b(Fe)+c(Fe)+a(Co)+b(Co)+c(Co)≤77, and b(Nd)+c(Nd)+b(Pr)+c(Pr)+b(Dy)+c(Dy)≥0.

In general, one innovative aspect of the subject matter described in this specification can be embodied in a recycled Nd—Fe—B sintered magnet may include a composition of $W_aR_bA_c$, where waste material W may include material from a waste Nd—Fe—B sintered magnet, rare earth material R may include at least one of: a) Nd or b) Pr, and elemental additives A may include at least one of: a) Nd, b) Pr, c) Dy, d) Co, e) Cu, or f) Fe, and indices a, b, and c indicate atomic percentages of the corresponding compositions or elements and the atomic percentages of the rare earth material R and the elemental additives A have values satisfying Nd[0.1−19 at. %*s(Nd), x]Pr[0.1−19 at. %*s(Pr), y]Dy[0.1−19 at. %*s(Dy), z]Co[0 at. %, d]Cu[0 at. %, e]Fe[0 at. %, f] where [m,n] means a range from minimum m and maximum n; s(t) is the atomic percent of element t in starting composition; f(t) is the atomic percent of element t in final composition; x=18−[81, 99.9] at. %*(s(Nd)+s(Pr)+s(Dy)); y=18−[81, 99.9] at. %* (s(Nd)+s(Pr)+s(Dy)); z=18−[81, 99.9] at. %*(s(Nd)+s (Pr)+s(Dy)); d=3–[81, 99.9] at. %* s(Co); e=0.3–[81, 99.9] at. %*s(Cu); and f=77–[81, 99.9] at. %*(s(Fe)+s(Co)).

The foregoing and other embodiments can each optionally include one or more of the following features, alone or in combination. The rare earth material R and the elemental additives A may be distributed homogeneously throughout the recycled Nd—Fe—B sintered magnet such that a concentration of the rare earth material R and a concentration of the elemental additives A increases on average in a mixture of waste material W surrounding the primary $Nd_2Fe_{14}B$ phase within the recycled Nd—Fe—B sintered magnet. A first atomic percentage of the waste material W may include between about 99.9 at. % and about 81 at. % and a second atomic percentage of a combination of the rare earth material R and the elemental additives A may include between about 0.1 at. % and about 19 at. %. The recycled Nd—Fe—B sintered magnet may include an average grain size less than 5 microns. The recycled Nd—Fe—B sintered magnet may include an average grain size less than 2.5 microns. The recycled Nd—Fe—B sintered magnet may include a density between about 7.56 $g/cm^3$ to about 7.6 $g/cm^3$.

In some implementations, the recycled Nd—Fe—B sintered magnet may include an atomic percentage of Co less than or equal to 3%. The recycled Nd—Fe—B sintered magnet may include an atomic percentage of Cu less than or equal to 0.3%. The recycled Nd—Fe—B sintered magnet may include a combined atomic percentage of Fe and Co less than or equal to 77%. The recycled Nd—Fe—B sintered magnet may include a combined atomic percentage of Nd, Dy, and Pr less than or equal to 18%. The elemental additive A may include pure Nd. The elemental additive A may include pure Pr.

In general, one innovative aspect of the subject matter described in this specification can be embodied in a system for harvesting a waste Nd—Fe—B sintered magnet from an end-of-life product, the system including a positioning mechanism that defines a recess to receive and locate the end-of-life product relative to the positioning mechanism, the end-of-life product including the waste Nd—Fe—B sintered magnet, a separating station to substantially separate a portion of the end-of-life product containing the waste Nd—Fe—B sintered magnet from the remainder of the end-of-life product when the positioning mechanism moves the respective end-of-life product through the separating station, and a transport station that receives the portion of the end-of-life product containing the waste Nd—Fe—B sintered magnet from the positioning mechanism when the positioning mechanism moves the respective end-of-life product to the transport station.

The foregoing and other embodiments can each optionally include one or more of the following features, alone or in combination. The system may include a loading station, and a loading device that loads the end-of-life product onto the positioning mechanism at the loading station. The loading device may orient the end-of-life product on the positioning mechanism to position the portion of the end-of-life product containing the waste Nd—Fe—B sintered magnet for separation from the remainder of the end-of-life product at the separating station. The loading device may include a robot. The loading device may include a feeder. The transport station may include a reclaim bin that receives the portion of the end-of-life product containing the waste Nd—Fe—B sintered magnet of at least some of the end-of-life products from the positioning mechanism.

In some implementations, the transport station includes a tool to finish removing the portion of the end-of-life product containing the waste Nd—Fe—B sintered magnet from the remainder of the end-of-life product. The tool may include a deflection surface. The tool may include an abrasive cutter.

In some implementations, the transport station includes a reclaim bin that receives the portion of the end-of-life product containing the waste Nd—Fe—B sintered magnet of at least some of the end-of-life products when the tool finishes removing the portion of the end-of-life product containing the waste Nd—Fe—B sintered magnet from the remainder of the end-of-life product. The transport station may include a conveyor that receives the portion of the end-of-life product containing the waste Nd—Fe—B sintered magnet of at least some of the end-of-life products when the tool finishes removing the portion of the end-of-life product containing the waste Nd—Fe—B sintered magnet from the remainder of the end-of-life product. The transport station may include a chute that receives the portion of the end-of-life product containing the waste Nd—Fe—B sintered magnet of at least some of the end-of-life products when the tool finishes removing the portion of the end-of-life product containing the waste Nd—Fe—B sintered magnet from the remainder of the end-of-life product.

In some implementations, the system includes a base to support the positioning mechanism, and an aperture in the base at the transport station to allow the portion of the end-of-life product containing the waste Nd—Fe—B sintered magnet to fall into the reclaim bin. The system may include a discard station that removes the remainder of the end-of-life product of at least some of the end of life products from the positioning mechanism. The discard station may include a discard bin. The positioning mechanism may rotate around a center axis to move the end-of-life products between the separating station and the transport station. The system may include a base table to support the positioning mechanism. The system may include bearings located on the base table that support the positioning mechanism and reduce friction between the base table and the positioning mechanism.

In some implementations, the separating station may include one of a plasma cutter, a water jet, a blade cutter, a band saw, and a shear. The positioning mechanism may include turntable defining a plurality of recesses each of which receives one of the end-of-life products at a loading station. The system may include a filtered vent to remove waste particles from the system. The system may include an inertial separator to remove waste particles from the system. The system may include a vent to exhaust pollutants from the system. The system may include a heater that receives the portions of the end-of-life product containing the waste Nd—Fe—B sintered magnet from the transport station and heats the portions of the end-of-life product containing the waste Nd—Fe—B sintered magnet to a temperature above the Curie temperature of the magnetic material. The system may include a cooler that rapidly cools the portions of the end-of-life product containing the waste Nd—Fe—B sintered magnet to facilitate detachment of the respective magnetic material from respective subassemblies in the portions of the end-of-life product containing the waste Nd—Fe—B sintered magnet. The cooler may rapidly cool the portions of the end-of-life product containing the waste Nd—Fe—B sintered magnet to 5° C. after the heating of the portions of the end-of-life product containing the waste Nd—Fe—B sintered magnet to the temperature above the Curie temperature of the magnetic material.

In general, one innovative aspect of the subject matter described in this specification can be embodied in a gas mixing apparatus for fragmenting and mixing waste magnetic material including a plurality of reaction vessels, each of the plurality of reaction vessels may include an internal liner having a plurality of openings defined therein, each of the internal liners configured to receive magnetic material and facilitate the circulation of gas around the magnetic material through the plurality of openings, and a pump and valve assembly operatively coupled to the plurality of reaction vessels to control the introduction of gas into the plurality of reaction vessels and to control transfer of gas between the plurality of reaction vessels.

The foregoing and other embodiments can each optionally include one or more of the following features, alone or in combination. Each of the plurality of reaction vessels may include a diffusion promotion device may include a plurality of apertures defined through the device, the diffusion promotion device operatively coupled to the pump and valve assembly and configured to promote the distribution of gas throughout the reaction vessels. Each of the plurality of reaction vessels may include a removable lid. The pump and valve assembly may be operatively coupled to the plurality of reaction vessels to allow for one or more of: vacuum pump evacuation of the reaction vessels; venting gas to atmosphere from one of the reaction vessels; pressurizing the reaction vessels; and backfilling one or both of the reaction vessels with gas. The apparatus may include a controller operatively coupled to the pump and valve assembly to automate the gas mixing processes and gas transfer between the reaction vessels.

In some implementations, the apparatus includes a gas storage chamber, wherein the gas storage chamber is configured to store gas transferred from one of the reaction vessels prior to transfer to the other of the reaction vessels. The gas may be hydrogen or a mixture of an inert gas and hydrogen. One or more of the reaction vessels may include a circulation promoter configured to promote gas flow inside each of the reaction vessels. The circulation promoter may include one of a stirrer, fan, or gas feed. Each of the plurality of reaction vessels may include a separate gas supply line connected between the reaction vessel and the pump and valve assembly. The gas mixing apparatus may be configured to produce a powder particle size between 1-10 μm from the waste magnetic material.

In general, one innovative aspect of the subject matter described in this specification can be embodied in a hydrogen mixing apparatus for fragmenting and mixing waste magnets to form an optimal powder and/or hydride blend, the apparatus includes a pair of reaction chambers, and a gas management component connected to, and interconnecting, the pair of reaction chambers, the gas management component configured to transfer gas between the pair of reaction chambers and to pressurize one of the reaction chambers to a target pressure.

The foregoing and other embodiments can each optionally include one or more of the following features, alone or in combination. The gas management component may include a pump and valve assembly operatively coupled to the pair of reaction chambers to control the introduction of gas into the pair of reaction chambers and to control transfer of gas between the pair of reaction chambers. At least one of the reaction chambers may include a thermostatically regulated heater within the chamber. The apparatus may include a carriage assembly configured to be received with one of the pair of reaction chambers, the carriage assembly may include one or more bottles containing waste magnetic material. The carriage assembly may include a removable cover. The bottles may include a removable cover, the cover configured to act as a funnel to permit recovered hydride magnet particles to be directed through a chute following the hydrogen mixing process. One or more of the bottles may include a device that facilitates gas diffusion within an interior of the bottle. The device may include a cylinder with openings in a side of the cylinder that allow for the diffusion of gas so the gas reaches the waste magnetic material contained within the bottle.

The subject matter described in this specification can be implemented in particular embodiments so as to realize one or more of the following advantages. In some implementations, a recycling process has low energy consumption and low virgin material consumption. In some implementations, recycling Nd—Fe—B magnets may reduce economic and/or environmental costs, without diminishing the magnetic performance and deliverable value of a final product, a fully dense Nd—Fe—B sintered magnet. In some implementations, a recycled Nd—Fe—B magnet product may have a performance similar to or better than virgin Nd—Fe—B magnets. In some implementations, a recycled Nd—Fe—B magnet product may include as much as 99.9% of the waste starting magnetic material used to create the recycled magnet.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-C show an example of a separation machine.

FIGS. 4A-E, 4H and 4J show reaction bottles which may be placed on a carriage to permit transport of the reaction bottles into and out of a reaction chamber.

Like reference numbers and designations in the various drawings indicate like elements.

DETAILED DESCRIPTION

Figure 1A:
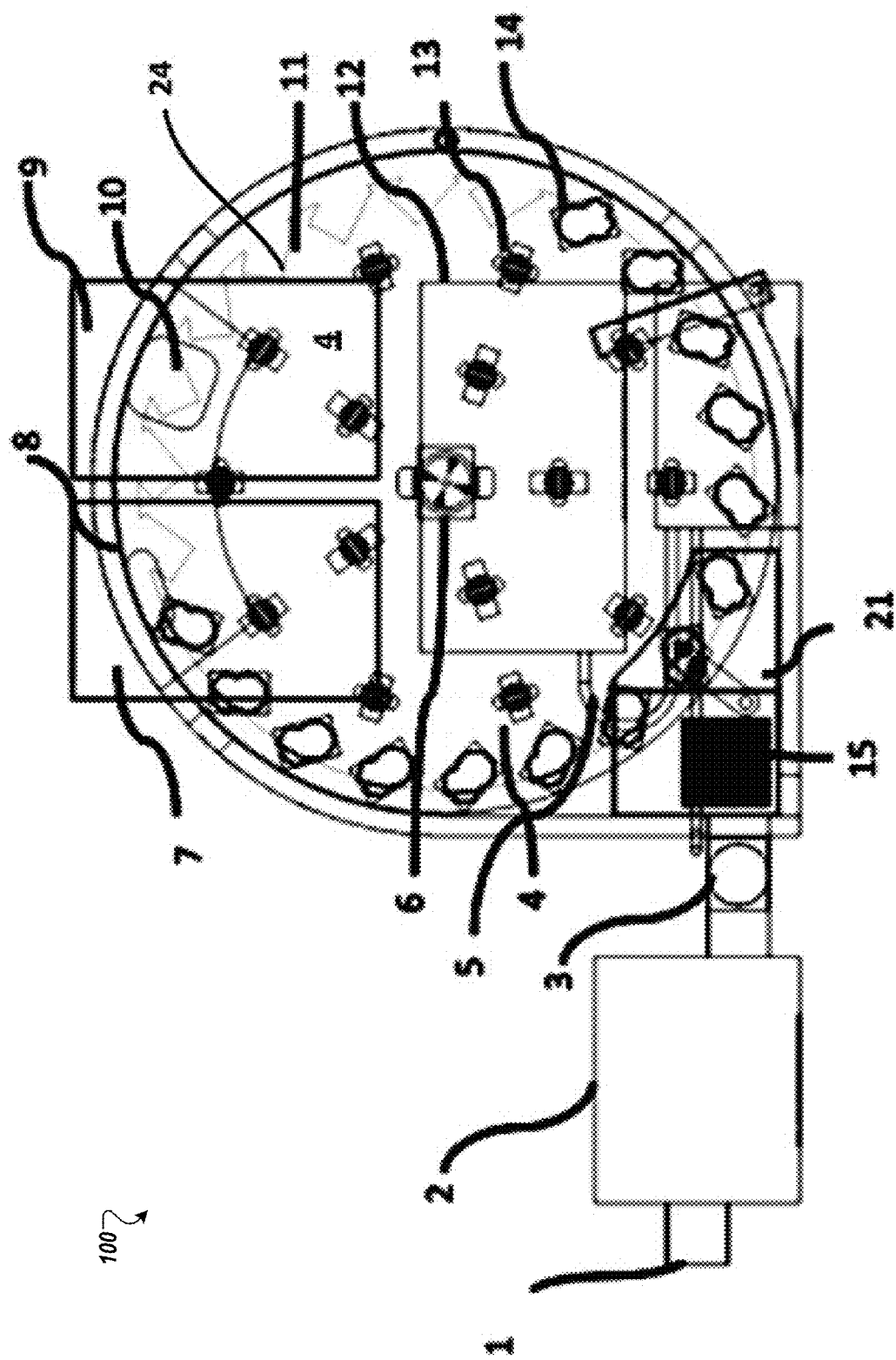

According to some implementations, a method is described for manufacturing fully dense Nd—Fe—B sintered magnet using waste magnets, e.g., bulk magnetic material and/or end-of-life (EOL) magnets. Bulk magnets refer to magnetic material without end product finishing, particularly coating materials. An example of bulk magnet material is magnetic material discarded as a result of material losses, machining (tailings) and inefficiencies that occur during manufacturing. Another term used in the industry for such material is drop. End-of-life (EOL) magnets refer to magnets and pieces of magnets that include end product finishing, particularly, coating materials. Examples of EOL magnet materials include magnets or pieces thereof that have been harvested from discarded products. For example, magnets that are separated from their magnetic circuitry, assembly, or other substrates but which may still retain their coatings. An end-of-life product would be a product that includes an EOL magnet, such as a hard disk drive.

A method for manufacture may reduce the number of activities in the total value chain compared to traditional Nd—Fe—B manufacture, e.g., mining, concentration, oxide production, chloride production, alloy production, strip-casting procedures have all been eliminated. A product resulting from the processes described below is a fully dense Nd—Fe—B sintered magnet that may exhibit high performance characteristics with respect to remanence (Br), coercivity (iHc), and energy product (BHmax), as described below with reference to the Tables. In some implementations, the product can be manufactured with equal or greater remanence (Br), coercivity (iHc), or energy product (BHmax) than the waste starting material. The new Nd—Fe—B product may exhibit improved temperature profile and corrosion resistance compared to the waste starting material. A method may have low virgin material input requirements and low basic operational costs. The process may combine 81-99.9% of waste magnetic material and/or magnet and 0.1-19% of rare earth elemental additives, and the process may have a high affinity for recovery of all elements present in waste magnet, e.g., Nd, Dy, Pr and Fe, Co, Cu, Al, Ti, Zr, Gd, Tb, etc., and magnetic performance, e.g., Br, iHc, or BHmax, etc.

A method for manufacturing fully dense Nd—Fe—B sintered magnet may include: extraction of EOL magnet component(s) from product structure(s), including, but not limited to, hard disk drives, motors, generators, or loudspeakers; and preparation of magnet and magnetic material through mechanical and chemical measures and treatments prior to a method for new Nd—Fe—B sintered magnet product manufacturing. A method for Nd—Fe—B sintered magnet product manufacturing may include removal of a coating directly from the extracted EOL magnet components. A method may include one or more mixing operations of the resulting uncoated material, at least one of which may include, but is not limited to, mixing uncoated magnetic material using a hydrogen mixing reactor. A method may employ methods for oxygen suppression. A method may include the addition of new rare earth material in a range of 0.1 to 19% of the starting material. Further details and optional features of some implementations include operations that maintain, improve, and/or provide specific targeted Nd—Fe—B magnet performance characteristics. Such performance characteristics may include desired combinations of particle size, alignment, density, energy product (BHmax), coercivity (iHc), and/or remanence (Br).

Some implementations may reduce the need for new rare earth supply when manufacturing a recycled product with desired properties. Some implementations may alleviate rare earth supply risk and end-user vulnerability to rare earth price volatility, play an important role in creating a more sustainable magnet supply chain, or a combination of any two or more of those. In some implementations, material input requirement costs are reduced by utilizing waste magnetic material instead of mined virgin material. Resource requirements in terms of materials, waste, pollution, and energy may be reduced with concomitant benefits.

In some implementations, methods include component recovery of Nd—Fe—B magnet contained or embedded in a product structure, such as EOL products. In initial processing, which may be characterized as a harvesting phase, a method may include the harvesting of EOL Nd—Fe—B magnets from attached assemblies or component materials, which are contained in or separated from EOL product. In some implementations, the initial processing includes consolidation of components containing EOL Nd—Fe—B magnet and separation of EOL Nd—Fe—B magnet from assembly material in order to increase the concentration of magnet to total mass. The initial processing may detach, fragment, or disintegrate the coating on the magnet and/or any material, such as adhesives, that secure the magnet to other materials, e.g., magnetic circuit or support chassis.

The initial harvesting processing may be followed by a further step that includes a heating and cooling operation, adapted to separate adhesive bonds between magnets and magnetic assemblies, as well as an initial or complete breakdown of coatings on the magnets. In some implementations, the harvested magnetic assemblies are loaded into a furnace and exposed to a cyclic heating process. In such a process, the material may be heated above the Curie temperature, for example at 600° C., of the Nd—Fe—B sintered magnet, e.g., the point where the magnetic flux is reduced to zero, in order to demagnetize the magnet and weaken or burn any adhesive attached to the magnets or parts thereof. For example, a first heating cycle may be one in which the materials are heated to at least 400° C. or to a sufficiently high temperature and long enough to cause the sintered magnet to demagnetize. A second heating cycle may be performed at a sufficiently high temperature, e.g., 650° C., and/or long enough to ensure that the adhesive is weakened or destroyed. Rapid cooling at the end of the first or second heating cycles may be used to aid in the detachment of the rare earth magnet from any assembly and to completely or partly fragment and/or delaminate any coating layer covering the magnet. The heating and cooling process may also include demagnetization and/or fragmentation and/or delamination of the coating of EOL magnets that have already been separated from other parts or assemblies, such as support chassis, magnetic circuits, or other parts.

In some implementations, the repeated heating of a magnet attached to another part, e.g., an assembly, a magnetic circuit, a support, or other part, at 650° C., with a hold time of 1 hour followed by rapid cooling to 5° C., is effective to remove the magnet from magnetic assemblies, to weaken or destroy any adhesive and to crack any coating layer on the magnets.

The heating process may be conducted with air, argon, or any other inert atmosphere. Heating may be performed using any suitable technique including, for example, resistive heating, radio frequency heating, convection, microwave heating, gas combustion heating, or immersion into chemical hot bath or other convection heating. Magnets may then be separated using a separation device and collected and transported using a suitable conveyor.

A process whose principal purpose is the removal of coatings of magnets, which may be characterized as surface removal process, may employ mechanical surface removal techniques, for example the use of an abrasive jet. The surface removal process may include centrifugal drum, grinding, or immersion in a hot chemical bath.

In some implementations of the coating removal phase, for 100 kg of mixed waste magnets, 15 minutes of abrasive jet using steel shot having a diameter of 1 mm was found to be sufficient to remove a protective layer on NiCuNi, aluminum, black epoxy, and zinc coated magnets of different shapes. This protective layer may be collected by sieving for the purpose of recycling and the extracted magnets are forwarded for further processing.

The atmosphere and temperature may be controlled during abrasive jet processing. In some implementations, abrasive jet, e.g., shot blasting, processing may be performed in an air, argon, or other inert atmosphere at 5° C. to 600° C. with humidity preferably in the range of 0-35%. In some examples, the mass loss of waste sintered Nd—Fe—B material during this operation was less than 1%. The duration of processing, velocity of particulate material, e.g., shot, and/or other parameters may be selected to limit mass loss to no more than 1%. In some implementations, the parameters may be chosen to ensure a mass loss of no more than 10% and, in some implementations, no more than 5%.

The mechanically uncoated magnets may be chemically processed in 1-5% diluted HCl or $HNO_3$ to further remove any oxide layer from the surface of waste magnet. The implementations are not limited to these options and in some implementations other agents may be used to remove oxide, for example, $CuSO_4$. The mass loss during this process may be held in the range of 0.1-5%. Preferably the time, temperature, and concentration are chosen such that the mass loss is no more than 10% and, specifically, no more than 20%.

In a mixing phase, bulk magnets are mixed with additional raw material to achieve desired final properties in a finished product made from the materials. The mixing process may include crushing, grinding, milling, or the use of hydrogen to break down materials to coarse powder. In some implementations, the magnets, e.g., Nd—Fe—B or 2:17 type magnets, are processed into a powder using a hydrogen mixing reactor, and the powder material is combined in situ with additives to restore or improve remanence, energy product, and/or density.

In some implementations, additional magnetic material may be added to waste magnetic material to recover or improve the performance of the magnets. The additional magnetic material may be a combination of a rare earth, RE, e.g., Nd, Pr, Dy, Gd, Tb, La, Ce, Yb, Ho, or Eu, and a transitional metal, TM, e.g., V, Cr, Mn, Fe, Co, Ni, Cu, Y, or Zr. For instance, the atomic percentages of the additional magnetic material may have a formula satisfied by equation (1) below.

$$Nd[0.1-19 \text{ at. }\%*s(Nd),x]Pr[0.1-19 \text{ at. }\%*s(Pr),y]Dy[0.1-19 \text{ at. }\%*s(Dy),z]Co[0 \text{ at. }\%,d]Cu[0 \text{ at. }\%,e]Fe[0 \text{ at. }\%,f] \quad (1)$$

Where [m,n] means a range from minimum m and maximum n, s(t) is the atomic percent of element t in starting composition, f(t) is the atomic percent of element t in final composition, $x=18-[81, 99.9]$ at. $\%*(s(Nd)+s(Pr)+s(Dy))$, $y=18-[81, 99.9]$ at. $\%*(s(Nd)+s(Pr)+s(Dy))$, $z=18-[81, 99.9]$ at. $\%*(s(Nd)+s(Pr)+s(Dy))$, $d=3-[81, 99.9]$ at. $\%*s(Co)$, $e=0.3-[81, 99.9]$ at. $\%*s(Cu)$, and $f=77-[81, 99.9]$ at. $\%*(s(Fe)+s(Co))$.

Additional requirements include one or more of the following: a) Virgin material added, NdpPrqDyr, need be in the range of $0.1 \le p+q+r \le 19$ at. % of final product, and $T \ge min(R, 18)$, where $T=f(Nd)+f(Pr)+f(Dy)$ and $R=s(Nd)+s(Pr)+s(Dy)$; b) $p+q+r \ge X$, where X is at. % RE (Nd, Pr, Dy) removed from original magnet; c) $T \le 18\%$; d) $f(Nd)+f(Pr)>0$, where f is an at. % fraction of the final product; e) $f(Nd)+f(Pr)+f(Dy) <= 18$; f) $f(Co) <= 3$; g) $f(Cu) <= 0.3$; h) $f(Fe)+f(Co) <= 77$; or i) $f(Dy)+f(Nd)+f(Pr) >= R$.

Processes for mixing include milling, cutting, high energy ball milling, roller milling, sawing, jet milling, tumbling, shaking, jaw crushing, and hydrogen mixing. In some implementations, hydrogen mixing is a process for homogenizing starting material waste magnets and fresh rare earth elemental additives. In the hydrogen mixing process, hydrogen enters the φ phase, e.g., $Nd_2Fe_{14}B$, and rare earth rich grain boundaries of waste magnets and reacts with the rare earth elements forming a hydride with hydrogen being trapped in the crystalline structure. The crystal structure expands as a result of hydrogen absorption and hydride formation causing the brittle structure to fracture. The result can be effective for mixing and, at the same time, for fragmentation of the waste magnet and additive materials.

The term "fragmentation" as used herein comprehends any type of division of solid materials including mechanical, chemical, thermal, radiative, or any suitable process including combinations thereof. The degree of fragmentation may be from coarse division to complete disintegration to a fine powder.

In some implementations, a method provides for the addition of 0.1 to 19 wt. % of one or more rare earth elemental additives to a composition or method described herein. In another aspect, a method provides for the addition of about 0.1 wt. %, about 0.2 wt. %, about 0.3 wt. %, about 0.4 wt. %, about 0.5 wt. %, about 1 wt. %, about 2 wt. %, about 3 wt. %, about 4 wt. %, about 5 wt. %, about 6 wt. %, about 7 wt. %, or about 8 wt % of one or more rare earth elemental additives or a combination of one or more rare earth elemental additives to a composition or method described herein. In yet another aspect, a method provides for the addition of about 0.1-0.5 wt. %, about 0.1-1 wt. %, about 0.5-1 wt. %, about 1-2 wt. %, about 1-3 wt. %, about 1-5 wt. %, about 1-8 wt. %, about 2-4 wt. %, about 2-6 wt. %, about 3-5 wt. %, or about 3-8 wt. % of one or more rare earth elemental additives or a combination of one or more rare earth elemental additives to a composition or method described herein.

In some implementations, the method includes no more than 0.1-1 at. %, preferably 1%, of Pr, 25 wt. %, /Nd, 75 wt. %, rare earth elemental additives. In situ production of a desired fine and impurity-free powder mixture using hydrogen mixing reactor, together with essential rare earth elemental additives and/or hydride additions of fresh elements, may be effective for recovering or improving magnetic performance from waste Nd—Fe—B-type sintered magnetic materials. Addition of 0.1 wt %-19 wt %, preferably 1%, of additive elemental additives may be included to restore or improve the magnetic performance and physical properties, e.g., density or corrosion resistance, of the magnetic material. The additions and waste magnetic material are loaded in the hydrogen mixing reactor to generate a coarse powder mixture of rare earth including $Pr_{75}Nd_{25}H_x$, where x is ranging from 1 to 3 mole fractions.

The hydrogen mixing process may be performed at 20-150° C. at 1 to 60 bar pressure under a hydrogen atmosphere. After that, the material may be heated, preferably in situ, to 550-600° C. to partially degas the mixture. The average particle size generated by the mixing step may be in the range of 1 µm to 2000 mm. If a pressure of 50 bar is used, the average particle size may correspond to a grain size, e.g., 2-8 µm, present in the waste magnetic material, and powders in the range of 500 µm to 2000 mm that have not reacted with hydrogen due to oxidation. The powder may be sieved to remove the oxidized coarse rare earth powders.

In some implementations, the hydrogen mixing process employs a high enough pressure to ensure that particles are small enough for a final magnet and the jet milling operation can be skipped. In this example, the sieving to remove larger particles, thereby to remove particles with higher concentration of oxygen, may be advantageous. The sieving is effective because the oxides constitute a harder fraction of the recovered material from the magnet and resist reduction to smaller particle sizes.

Further mixing and homogenization of the magnetic powder mixture may be transferred to a roller mill for further homogenization of the mixture. The milled material may be lubricated, for example, with 1% of Zn stearate, during roller milling. After the roller milling step, waste magnetic powders may be sieved to further remove any remaining rare earth oxide. In some implementations, the sieving may be selective to remove particles bigger than 500 µm.

The lubricant used for roller milling may have low oxygen content and/or contain a binder. Examples of the lubricant include amide, e.g., oleamide or amide, or other lower carbon-hydrogenate esters or fatty acid, such as oleic acid.

Powders may be further homogenized by jet milling. In some implementations, the jet may be formed using air or an inert gas such as He, Ar, or N. The jet milling may be performed for such time, e.g., 1-4 hours, and at such velocity so as to homogenize the mixture and further break down aggregates of single grains to 1-4 µm. In some implementations, the jet milling may be completed in 24 hours or less.

In some implementations, an 80% reduction in time for the jet milling of Nd—Fe—B powders from waste may be observed compared to jet milling of Nd—Fe—B elemental additives. The average particle size of the waste magnets may be in the range of 4-10 µm. During jet milling, the aggregates were broken to single grains while an oxidized rare earth powder remained coarse. By removing the oxidized rare earth coarse powder, the amount of oxygen incorporated in the waste starting magnetic material can be reduced and more preferably suppressed in the final recycled sintered magnet. This phase may be done preferably under inert atmosphere, for example using Ar gas, free of any oxygen contamination, with the purpose of homogenizing the mixture of waste magnetic powder and fresh addition of $(RE(TM)_x)$ elemental additives and break the segregated single grains along grain boundaries. RE (rare earth) refers to a combination of any Nd, Pr, Dy, Tb, Y, La, or Sm and TM (transitional elemental additive material) refers to a combination of any Co, Ni, V, Nb, Mo, Ti, Zr, Al, Cu, Ga, or Fe.

After the particle reduction, mixing, and sieving are completed, the powder may be aligned and pressed to form a green compact in air or an inert atmosphere. A lubricant may be applied to the powder prior to pressing and aligning. The green compact may be pressed and aligned in a magnetic field. Then the green compact may go directly on to sintering in the range of 1050-1100° C. for 5 hours of holding time, followed by heat treatment at 900° C. for 5 hours and 550° C. for 3 hours. The selection of sintering temperatures may depend on the amount of total rare earth additions added prior to the hydrogenation/mixing steps.

In some implementations, processes for cost-effective, scalable recovery of waste magnetic material may be provided. A method may include mechanical automated processes for harvesting EOL magnet. The processes may provide a harvesting phase, which provides for the effective and rapid separation of EOL waste magnet from other material assemblies and/or attachments, and the collection/consolidation of the EOL magnet. A separation aspect of the harvesting process may include a cyclic heating and cooling process that accomplishes demagnetization and separation of adhesive bonds.

The processes can be applied to EOL magnets that may bear coating. Coatings can be removed by mechanical means to minimize contamination and to preserve the high recovery concentration of magnetic material. High recovery concentration of uncoated magnetic material may be attended by lower cost since the use of primary $CO_2$, CO, $SO_2$, $NO_x$ energy and materials may be significantly reduced, providing a greener process using the described methods.

The processes may provide for the expeditious restoration of magnetic performance by the addition of elemental additives, hydride, or other additives in a series of mixing phases to produce recycled sintered magnet with same or better magnetic performance than waste starting material. The described processes may prevent the loss or degradation of magnetic performance relative to the starting material by using 0.1-19 wt %, preferably 1 wt %, of raw/virgin/fresh additives in combination with 81-99.9 wt %, preferably 99 wt %, bulk material or uncoated EOL magnet.

In some implementations, hydrogen mixing may be used advantageously to facilitate homogenization of bulk material and/or EOL magnets with fresh elemental additives. This may be followed by jet milling, which may be used for further homogenization with supplemental materials, e.g., rare earth oxides or Nd/Pr, in a process that is amenable to cost efficient scalable processing. Other implementations may include milling, roller milling, high energy ball milling, tumbling and other mixing steps.

Figure 1B:
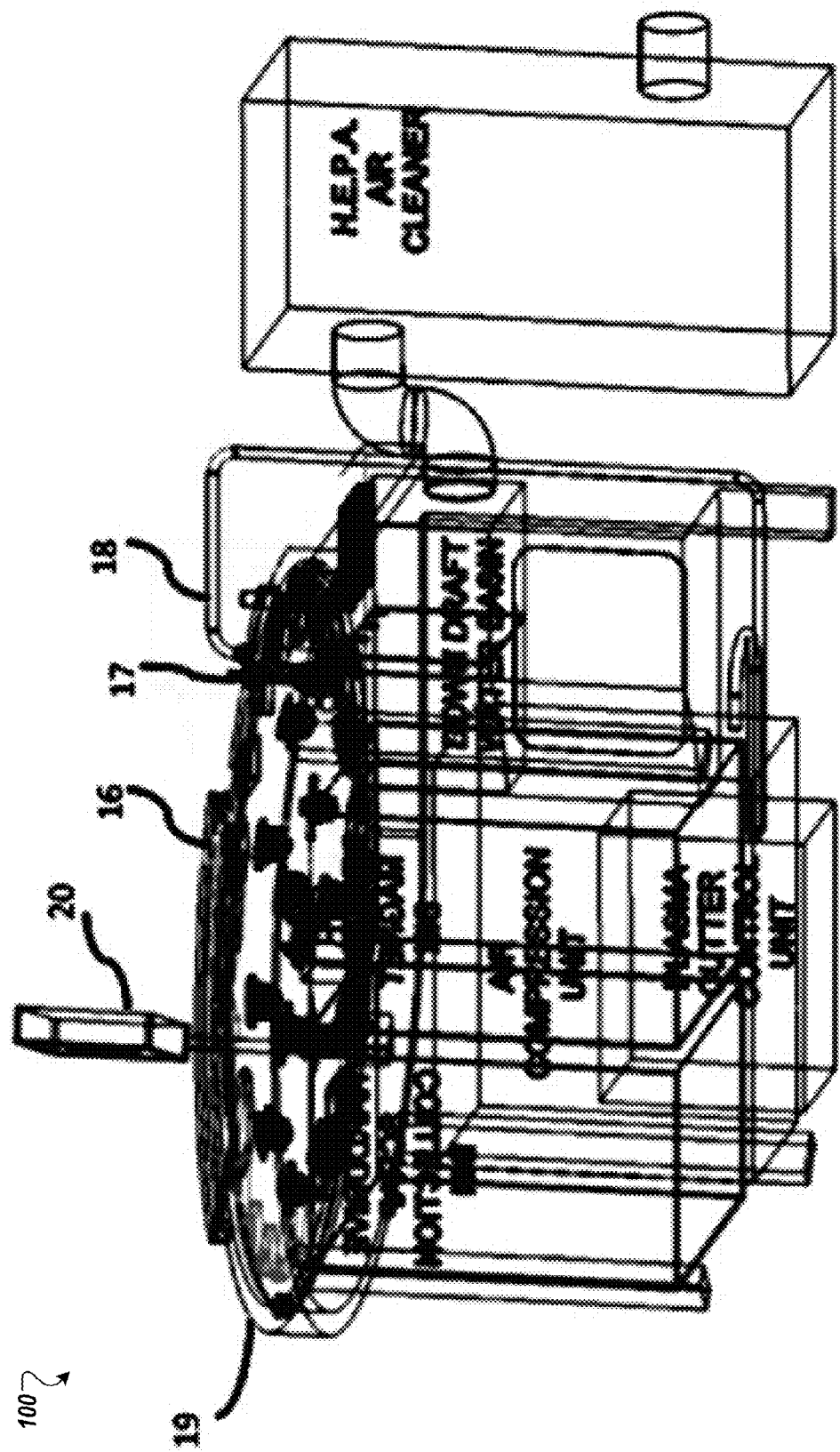

FIGS. 1A-C show an example of a separation machine 100. The separation machine 100 receives EOL articles, such as hard disks, and generates a flow of materials that has a high concentration of the magnet material of interest. The separation machine 100 may include a control unit 20 that controls the operation of the separation machine 100. A turntable 4, driven by a drive 12, rotates around a center 6 on bearings 13 supported on a base table 19.

In some implementations, hard disk drive (HDD) units 14 are loaded at a loading station 11 and affixed on a turntable either by a robot positioning device 16, a feeder, conveyer, or manually by a worker. The loading and affixing are effective to orient the HDD units 14 to be cut at a cutting station 21 by a plasma cutter, water jet, or blade cutter, e.g., that sends a pressurized gas such as N, Ar, or O through a small channel that is shielded by an inert gas fed through shielding-gas transport pipe 5, fixed at a particular point of the base table 19. For example, the turntable 4 rotates around the center 6 and moves the HDD units 14 from the loading station 11 to the cutting station 21 where the HDD units are cut to create HDD corners that include magnetic material from the HDD units 14.

In some examples, a plasma cutter may include a nozzle 17, positioned about two includes above an HDD unit, that ejects the plasma to remove the HDD corners form the HDD unites. The nozzle 17 may receive gas from a plasma control unit through a gas line 18.

In some implementations, the separation machine 100 may employ a band saw, or a shear at the cutting station. A shear operation may be altered to minimize pinching of the substrate that may restrict extraction of the magnet, damage to the recovered magnet, crushing of the HDD unit 14 corner portion, or any combination of two or more of these.

If not fully separated by the cutter, a deflection surface may further apply a force against the corner until it separates from the rest of the HDD unit, such as a downward facing deflection surface over an aperture 8 in the base table 19 above the corner reclaim bin 7 which permits the HDD corners to drop into the corner reclaim bin 7. In some implementations, an abrasive cutter, or an abrasive jet cutter, such as a water jet or other kind of cutting tool, may be used to separate the corner from the rest of the HDD unit 14.

A filtered vent 1 with a filter such as a HEPA filter 2 may be provided for particulate management. Other particulate management devices such as inertial separator 3 may be provided. Pollutants may be drawn through a downdraft vent 15.

The HDD units 14 may be held in a recess 24 of the turntable 4, shown in FIG. 1C, by gravity because the recesses 24 may be shaped such that the HDD units 14 are precisely oriented by their engagement with the turntable 4 within the recess 24. The recess, 24, can be modified according to the type of assembly which contains a magnet, e.g., motor, windmill assembly, etc. The HDD units 14 pass through the cutting station 21 which may fully or partly separate the corner that has the magnets to be recovered. The separated corner drops through the corner drop opening 8 into a corner reclaim bin 7 while the rest of the HDD unit drops through opening 10 into discard bin 9.

In some implementations, a chute or conveyor may be provided to transport HDD corners, or other magnet assemblies, to a location for further processing instead of the corner reclaim bin 7. In some examples, the HDD corners may be recovered in batches and transported for processing.

Figure 2:
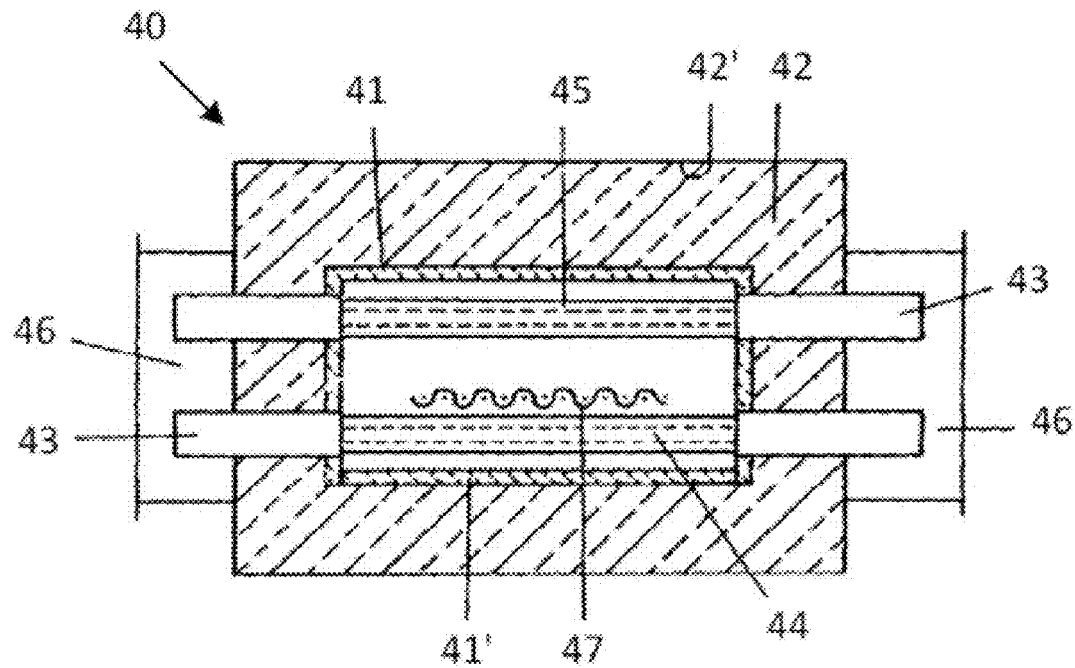
FIG. 2 shows an example of a furnace which processes magnets or magnetic assemblies for demagnetization and to remove assemblies from EOL magnets.

FIG. 2 shows an example of a furnace 40 which processes magnets or magnetic assemblies for demagnetization and to remove assemblies from EOL magnets. For instance, the HDD unit corners may be transported by conveyor 47 into the furnace 40. The furnace 40 is capable of reaching temperatures above the Curie temperature of the magnetic material using heaters 43, which may be electric, as shown with heating elements 44 inside ceramic sleeves 45, or any other suitable form of heater. Alternative heating methods may be used including resistive, radio frequency (RF), convection, microwave heating, gas combustion, immersion into chemical hot bath, any other appropriate heating method, or a combination of any two or more of these. Ductwork 46 may provide for a controlled atmosphere, such as inert gas, over the heated HDD corners or other waste material containing magnets to further suppress the progression of magnet oxidation.

The furnace 40 may include an insulated housing 42 with an exterior wall 42'. For example, the insulated housing 42 may reduce the amount of heat that escapes from the furnace 40 and/or protect objects outside of the furnace 40. Interior seals 41, 41' may reduce the amount of heat that escapes from the furnace 40.

The furnace 40 may be any type of heater configured to heat waste magnets and magnetic assemblies directly, substantially without atmospheric contamination so as to cause the detachment of the magnets from subassemblies and other non-magnetic material. The heating combined with subsequent fast cooling may serve to facilitate initial cracking of any magnet coating on a magnetic assembly. Demagnetization of the magnets may be ensured by heating at least to the Curie temperature, e.g., 320° C., of the magnetic material without an applied field.

The furnace 40 may have inner walls that define a sealed heating space in fluid communication with the ductwork 46 that provides a controlled inert or air atmosphere. The Curie temperature may be between 310° C. to 900° C. depending on the composition of the magnetic material. The Curie temperature, or a temperature in excess thereof, may be held to ensure the release or destruction of adhesives holding magnets to other parts of the magnetic assemblies, e.g., HDD unit corners containing magnetic circuit elements and/or supports. A rapid cooling, for example to 5° C., may follow the heating in order to further facilitate detachment of magnets from their subassemblies, subsequent fracturing of the coating, or both. The heating and cooling may be performed iteratively in multiple cycles or they may be performed once.

Figure 3A:
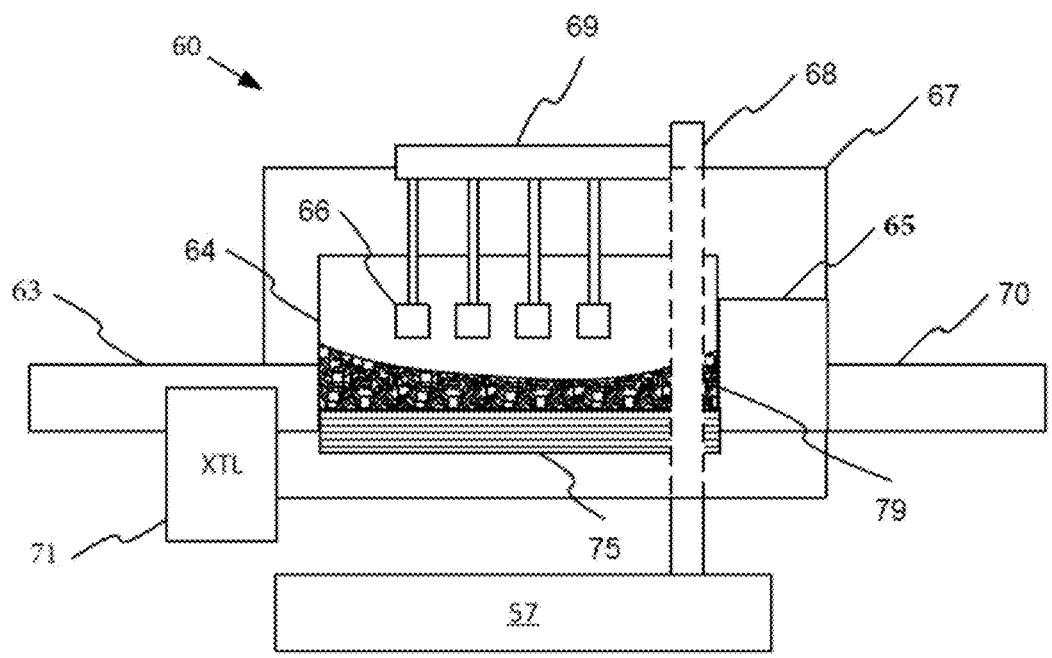
FIG. 3A shows an example of an abrasive jet cleaning device that cleans magnets.

FIG. 3A shows an example of an abrasive jet cleaning device 60 that cleans magnets 79. The abrasive jet cleaning device 60 has a frame 67 that supports an entering conveyor 63 that feeds the magnets 79 into a rotating drum 64. The drum 64 rotates to expose surfaces of the magnets 79 to jets of abrasive emanating from the jet nozzles 66.

Belt grinding rolls 75 may be provided to ensure the movement of the magnets 79 and their disaggregation to ensure material, such as adhesives and other magnet coatings, is removed from the magnets 79. The treatment of the magnets 79 by the abrasive jet cleaning device 60 may be effective for removing coating layers including, but not limited to, NiCuNi, Al, Zn, and electrolytically deposited black epoxy materials. The rollers 75 may rotate in a direction that is the same as that of the drum 64 so that magnet adjacent surfaces move in a direction opposite that of the surface of the drum 64. The rollers 75 may further remove surface material from the magnets. The use of the rollers 75 with the drum 64 may more evenly expose the surfaces of the magnets 79 to the shot blast treatment of the jet nozzles 66.

A dust/shot collection trough 57 receives shots and particulates from coatings, which may then be subjected to sieving, or other size or density-separation processes, to recover removed coating material and reuse the abrasive particulate, e.g., shot, which is conveyed by a conveyor 68 to a feeder/generator 69 that generates the abrasive jets ejected from nozzles 66.

Once the excess material is broken off of the magnets 79, an exit conveyor 70 removes the magnets from the jet cleaning device 60. An air washer 65 may remove any loose material off of the magnets 79 while the exit conveyor 70 removes the magnets from the jet cleaning device.

The abrasive jet cleaning device may include a control cabinet is shown at 71 to control the environment, e.g., processing time, atmosphere, speed, etc., for the jet cleaning device.

Magnet coatings may be completely removed by cleaning the surfaces with an abrasive jet that removes a portion, or all, of the surface of the magnets by ablation. In some implementations, the abrasive can be steel shot, tungsten carbide, ceramic, or steel grit. The size of the particles may be about 1 mm. The abrasive jet cleaning device 60 can receive waste magnets and substantially remove the surface or protective coatings from the waste magnets without oxygen contamination of the waste magnets, before further processing of the waste magnets. The atmosphere around the magnets may be a controlled inert atmosphere such as Argon.

The magnets 79 may be processed in the abrasive jet cleaning device 60 at temperatures between about 5° C. and 600° C. with a humidity level between about 1-35% relative humidity (RH).

In some implementations, the surface removal process is performed for a period of time effective to remove less than 5% of the mass of the magnets. In some implementations, the surface treatment is performed for a period between about 15 minutes and about 5 hours.

Figure 3B:
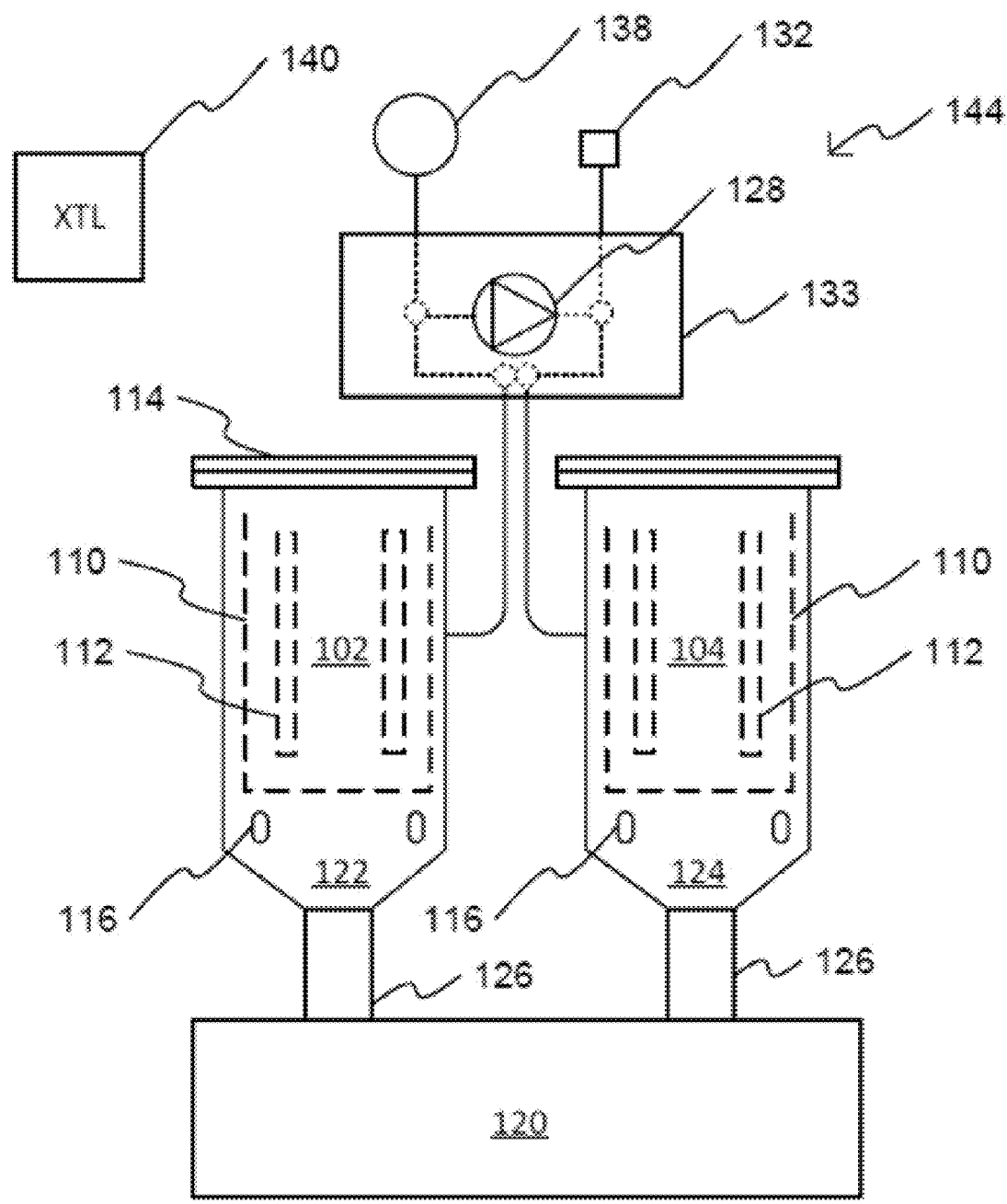
FIG. 3B shows an example of a hydrogen mixing reactor that breaks waste magnetic material into particles and mixes the particles.

FIG. 3B shows an example of a hydrogen mixing reactor that breaks waste magnetic material into particles and mixes the particles. In some implementations, the hydrogen mixing reactor mixes elemental additives with the particles. The hydrogen mixing reactor may create particles with a target average diameter of between about 1 micron to about 2 mm, or between about 4 to about 7 microns. The hydrogen mixing reactor includes two vessels 102, 104, placed in mixing chambers 122, 124 respectively, that each has inner linings 110 that hold the magnetic material and facilitate the circulation of gas around the magnetic material through apertures in the inner linings 110. The filling of one of the vessels 102, 104 with hydrogen gas while the vessel contains rare earth materials causes the fragmentation of the magnetic material due to hydrogen mixing. Exposure to hydrogen gas can last for between about 1 to 40 hours. The exposure may be for shorter or longer periods and the pressure and temperature may be selected based on process engineering requirements, other processing stages used to achieve a target particulate size, other processing stages used to achieve a target homogenous mixture, or any combination of two or more of these.

Diffusion promotion devices 112, such as snorkels or pipes, with apertures, may be used to ensure that hydrogen mixing causes the breakdown of the magnets in the reactor vessels 102, 104, and that the pile-up of particulate matter does not prevent some of the magnetic material from exposure to the hydrogen gas. Circulation promoters (not shown) such as stirrers, fans, or gas feeds may help promote hydrogen gas flow in the vessels 102, 104. Magnetic material that falls through the apertures of the inner lining 110 may be stirred by a stirrer located at the bottom of the respective vessel 102, 104.

A removable lid 114 may be provided for the introduction of magnets into the vessels 102, 104. For example, after the magnets 79 are cleaned in the abrasive jet cleaning device 60 shown in FIG. 3A, the magnets may be placed in the vessels 102, 104 shown in FIG. 3B. Magnetic material may be transferred into the inner linings 110 by a conveyor or manually, with or without a controlled environment, e.g., after the magnets are cleaned in the abrasive jet cleaning device 60. A small fraction of rare earth transitional elemental additive material may be added to the inner linings 110 to bring the properties of a final product made from the magnets to a predefined specification remanence, energy product, and/or coercivity. In some examples, an additive may be added to crushed waste magnet material after mixing to adjust the properties of the final product. Some examples of the additive material may include Nd, Pr, Dy, Gd, Tb, La, Ce, Yb, Ho, or Eu.

The vessels 102, 104 may withstand a predefined pressure. For instance, the hydrogen mixing reactor may include a vacuum pump. In some implementations, the pressure may be increased up to 60 bar. The vessels 102, 104 may also withstand lower pressures. The vessels 102, 104 may have thermostatically controlled heaters 116 and pressure regulation controls.

The hydrogen mixing reactor includes gas source connections 138 that introduce hydrogen or other gases into the vessels 102, 104 through a pumping assembly 128 and a valve assembly 133. The pumping assembly 128, the valve assembly 133 a gas management component 144, or a combination of two or more of these, may feed gas directly into the diffusion promotion devices 112, to ensure full volumetric perfusion of the magnetic material in the vessels 102, 104. In some examples, the pumping assembly 128 and the valve assembly 133 may connect the vessels 102, 104, allowing for vacuum pump evacuation of the vessels 102, 104, e.g., for degassing or primary loading of gas, pumping gas from one vessel to the other, e.g., to reclaim hydrogen gas, venting to atmosphere, e.g., using ambient connections 132 to the external atmosphere, pressurizing the vessels 102, 104, backfilling one or both of the vessels 102, 104 with inert gas, performing other reclamation processes or combinations of two or more of these. A controller 140 may be connected to the valve assembly 133 and the pump assembly 128 to automate the hydrogen mixing processes and hydrogen transfer between the vessels 102, 104.

During the hydrogen mixing process, magnetic particles fall from the vessels 102, 104 through chutes 126 into a chamber 120. The magnetic particles may be removed from the chamber 102 for further processing. In some implementations, press-withstanding valves may be employed at the openings between the chutes 126 and the vessels 102, 104.

In some implementations, one of the vessels 102, 104 is made gas tight and evacuated using the gas management component 144. The selected vessel 102, 104 may then be filled with hydrogen from a gas source, e.g., through the pumping assembly 138, to prepare the selected vessel 102, 104 for mixing and fragmentation of waste magnetic material. After mixing and fragmentation, the hydrogen may be transferred by the gas management component 144 to the other vessel 104, 102, e.g., by evacuating the hydrogen from the selected vessel 102, 104 and transferring the hydrogen to the other vessel 104, 102. As each vessel's contents are subjected to hydrogen mixing, the hydrogen can be recovered and transferred to the other vessel 102, 104 and the process of hydrogen mixing is repeated in the other vessel.

In some implementations, a gas storage chamber is included in the gas management component 144 and the hydrogen evacuated from one of the vessels 102, 104 is temporarily stored in the gas storage chamber (not shown) prior to transfer to the other vessel 102, 104, e.g., between hydrogen mixing cycles. The use of the gas storage chamber may allow the hydrogen mixing reactor to include only one vessel. In some examples, the hydrogen mixing reactor may include more than two vessels. The gas storage chamber may include multiple chambers constituting respective stages with volumes chosen to maximize the energy economy for transfer of gas to and from the chambers and the vessels 102, 104 by minimizing the pressure drop or elevation during transfer.

Figure 4A:
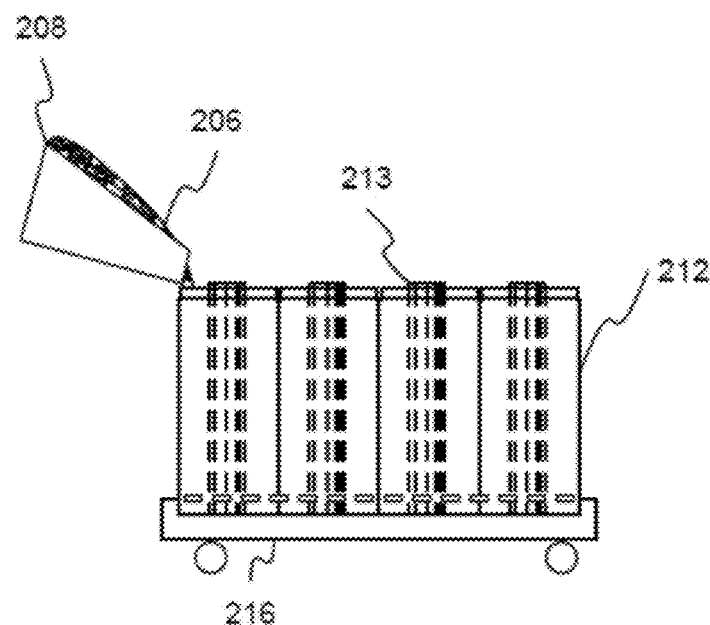
Figure 4B:
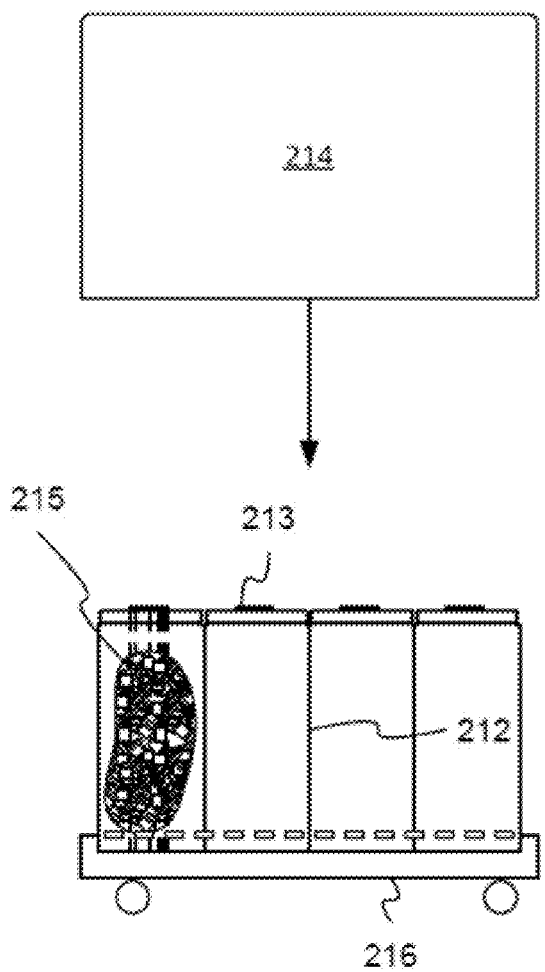
Figure 4F:
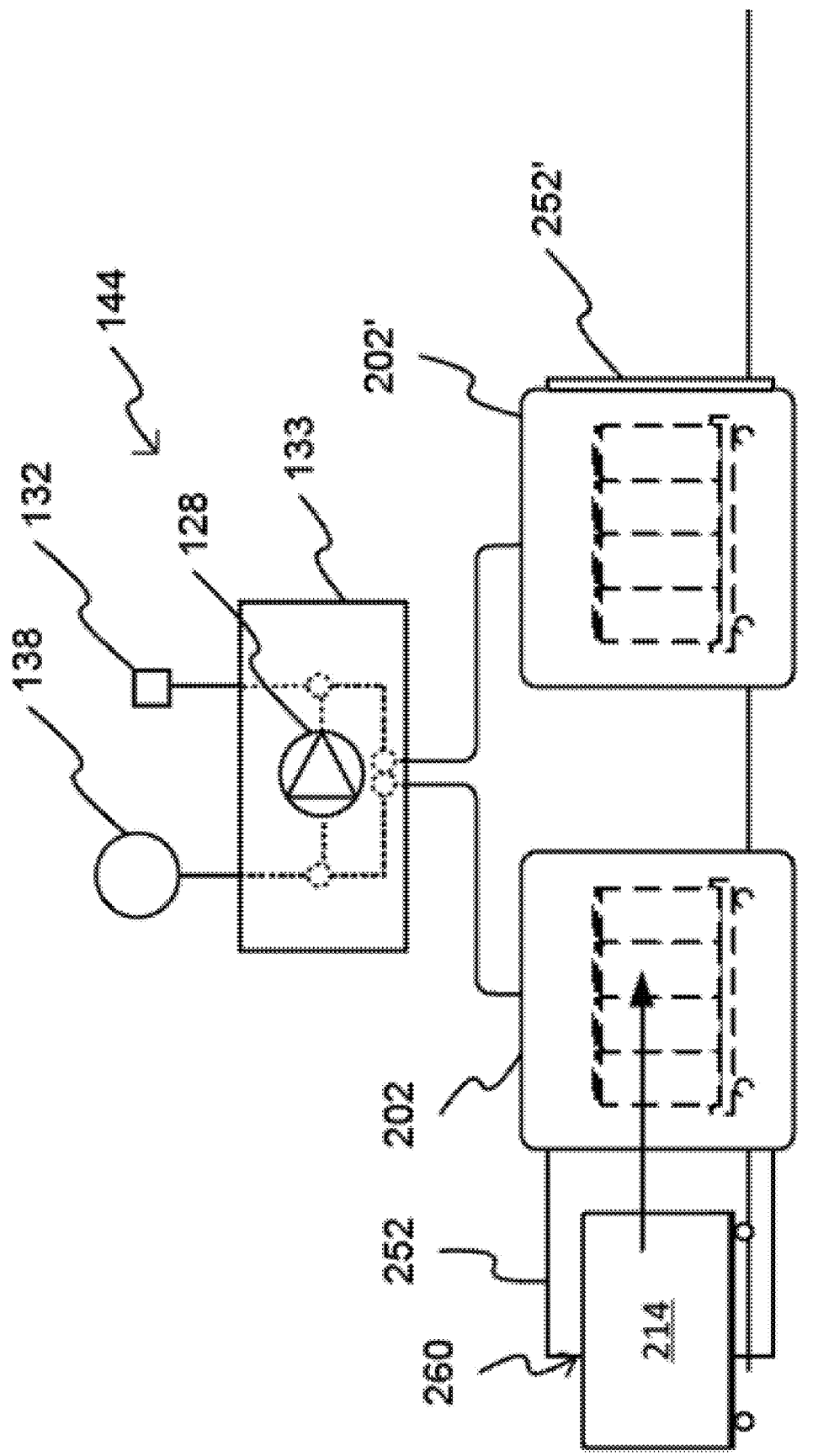
FIGS. 4F-G show an example of another hydrogen mixing reactor with a pair of reaction chambers.

FIG. 4A shows a set of four reaction bottles 212 on a carriage 216, which permits transport of the reaction bottles 212 into and out of a reaction chamber, e.g., one of the reaction chambers 202, 202' shown in FIG. 4F. The reaction chambers 202, 202' may be used in conjunction with or instead of the hydrogen mixing reactor shown in FIG. 3B. In some examples, the reaction bottles 212 may be used with the hydrogen mixing reactor shown in FIG. 3B, e.g., as the vessels 102, 104. For example, the gas management component 144 may fill the bottles 212 with inert gas, e.g., Ar or N, that are subsequently filled with magnets. Magnets 206, e.g., to be hydrogenated, are loaded from a transfer chute 208 into the reaction bottles 212. The magnets 206 may be loaded into the reaction bottles 212 in an inert atmosphere, to prevent the contamination of the magnets 206 such as by oxygen.

In some implementations, a small fraction of rare earth transitional elemental additive material may be added to the reaction bottles 212. The rare earth transitional elemental additive material may be selected to bring the properties of a final product, produced from the magnets 206 and the rare earth transitional elemental additive material, to a predefined specification remanence, energy product, and coercivity. In some examples, a hydride of the rare earth transitional elemental additive material may be added to the hydrogenated magnets 206 after mixing and fragmentation of the recovered magnets.

Each of the reaction bottles 212 may include a snorkel 213 or another device that facilitates gas diffusion in the reaction bottles. For example, the snorkels 213 may be a cylinder with openings in the side that allow for the diffusion of gas, so the gas reaches magnets positioned in the center of each bottle 212.

The bottles 212 and the snorkels 213 may be open at the top to allow hydrogen gas to enter the bottles 212 and the snorkels 213 and contact the magnets 206 contained within the bottles 212 and/or to allow loading of the magnets 206 into the bottles 212.

When the magnets 215 are positioned within the bottles 212, shown in FIG. 4B, a transfer cover 214 may be attached to the carriage 216 to isolate the bottles 212 and their contents from external atmosphere. The container formed by the cover 214 and carriage 216 may not allow for gas leakage so that its internal volume can maintain an atmosphere of inert gas preventing ambient air from contacting the magnets 215. For instance, after the bottles 212 loaded in the inert atmosphere, the bottles 212 may be covered by the cover 214, and the carriages 216 stored outside the space with the inert atmosphere. For example, FIG. 4E shows an example of a loaded bottle 212 prior to the placement of the loaded bottle 212 onto the carriage 216 and the cover 214 on top of the loaded bottle 212. The bottles 212 may be loaded while on the carriage 216 or may be loaded and then placed onto the carriage 216.

Figure 4G:
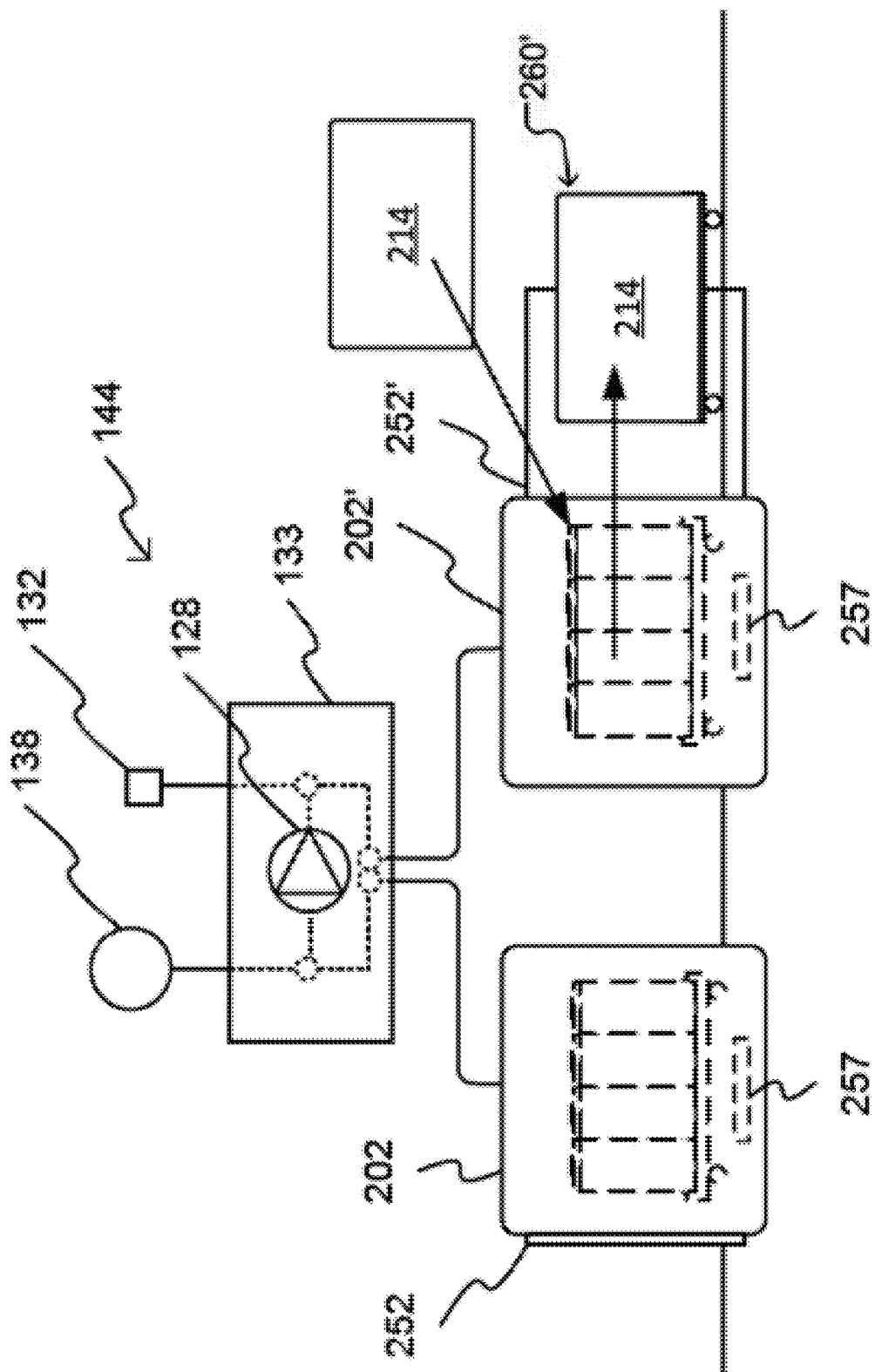

FIGS. 4F-G show an example of another hydrogen mixing reactor with a pair of reaction chambers 202, 202'. The reaction chambers 202, 202' are connected to, and interconnected by, a gas management component 144 as discussed above. The gas source 138 may provide respective connections for multiple gases such as inert gas and hydrogen. The ambient connection 132 may provide a vent to atmosphere. The gas management component 144 operates as described above with reference to FIG. 3B in that it transfers gas from one reaction chamber 202 to the other 202' and vice versa, instead of between the vessels 102, 104.

A covered carriage 260, e.g., the carriage 216, is rolled into a first one of the reaction chambers 202 while hydrogenation is occurring in the other reaction chamber 202'. Once the covered carriage 260 is in the reaction chamber 202, the cover 214 is removed from the carriage 260 and a hatch 252 on the reaction chamber 202 is closed. The chamber 202 may then be filled with inert gas.

The gas management component 144 may supply, to the reaction chamber 202, hydrogen from a hydrogen source to achieve a required pressure. For instance, when the hydrogenation in the reaction chamber 202' is complete, the gas management component 144 transfers hydrogen from the reaction chamber 202' into the reaction chamber 202 and pressurizes the reaction chamber 202 to a target pressure. The gas management component 144 may initiate hydrogenation in the reaction chamber 202 by introducing the hydrogen gas, e.g., pressurized hydrogen gas, from the reaction chamber 202 into the bottles 212 through the covers 232 or other openings in the bottles.

The hydrogen mixing process may create magnetic particles with an average diameter of between about 1 micro to about 2 mm, e.g., when the hydrogen mixing reactor performs an initial mixing process, or between about 4 micro to about 7 micro, e.g., when the hydrogen mixing reactor performs a second mixing process. In some examples, the hydrogen mixing reactor shown in FIGS. 4F-G may perform both processes, the hydrogen mixing reactor shown in FIG. 3B may perform both processes, or one of the reactors may perform one process and the other reactor may perform the other process. For instance, the hydrogen mixing reactor shown in FIG. 3B may perform the first mixing process and the hydrogen mixing reactor shown in FIGS. 4F-G may perform the second mixing process.

The gas management component 144 may evacuate, e.g., completely, gas from the chamber 202' and place the gas in the chamber 202, for use during processing in the chamber 202, or in a storage chamber or vessel. A thermostatically regulated heater 257 within the chamber 202, shown in FIG. 4G, may be regulated by a controller to provide a target temperature.

As the hydrogenation process proceeds in the reaction chamber 202, the gas management component 144 backfills the reaction chamber 202' with inert gas. The hatch 252' to the reaction chamber 202' is then opened, as shown in FIG. 4G, and a cover 214' is placed on the carriage 260'. The hydride magnet material, now reduced to particles, then moves out from the reaction chamber 202' in the carriage 260'.

After the hydrogenation is completed in the chamber 202, the gas management component 144 evacuates the excess hydrogen gas from the chamber 202. For instance, the hydrogenation process may begin again for one or more bottles 212 placed in the chamber 202'.

Figure 4J:
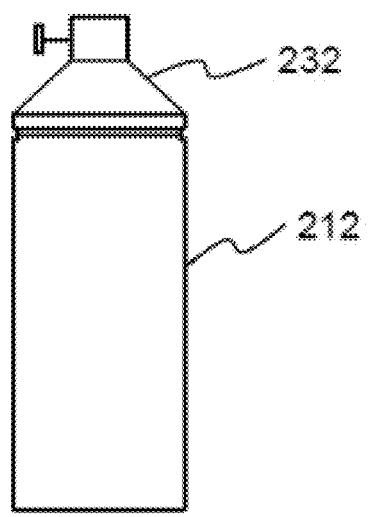

In some implementations, the bottles 212 can be closed with a cover 232, shown in FIGS. 4C-D and 4J, that acts as a funnel to permit recovered hydride magnet particles to be directed through a chute 237 when a valve 234 is open, e.g., when the bottle 212 is in the inverted position. The cover 232 may be removed, e.g., to allow the magnets 206 to enter the bottles 212, and placed on the respective bottles 212 afterward.

Referring to FIG. 4J, in an inert atmosphere, the covers 232 are positioned on the bottles 212 and the bottles can be sealed and removed from the inert atmosphere without the need for the cover 214. The bottles 212 can be transported by the carriage 216 or individually.

Figure 4H:
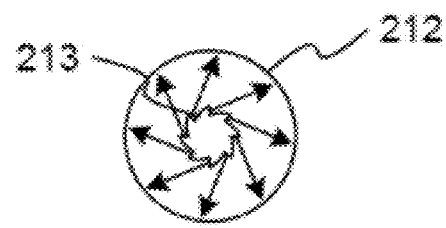
Figure 4K:
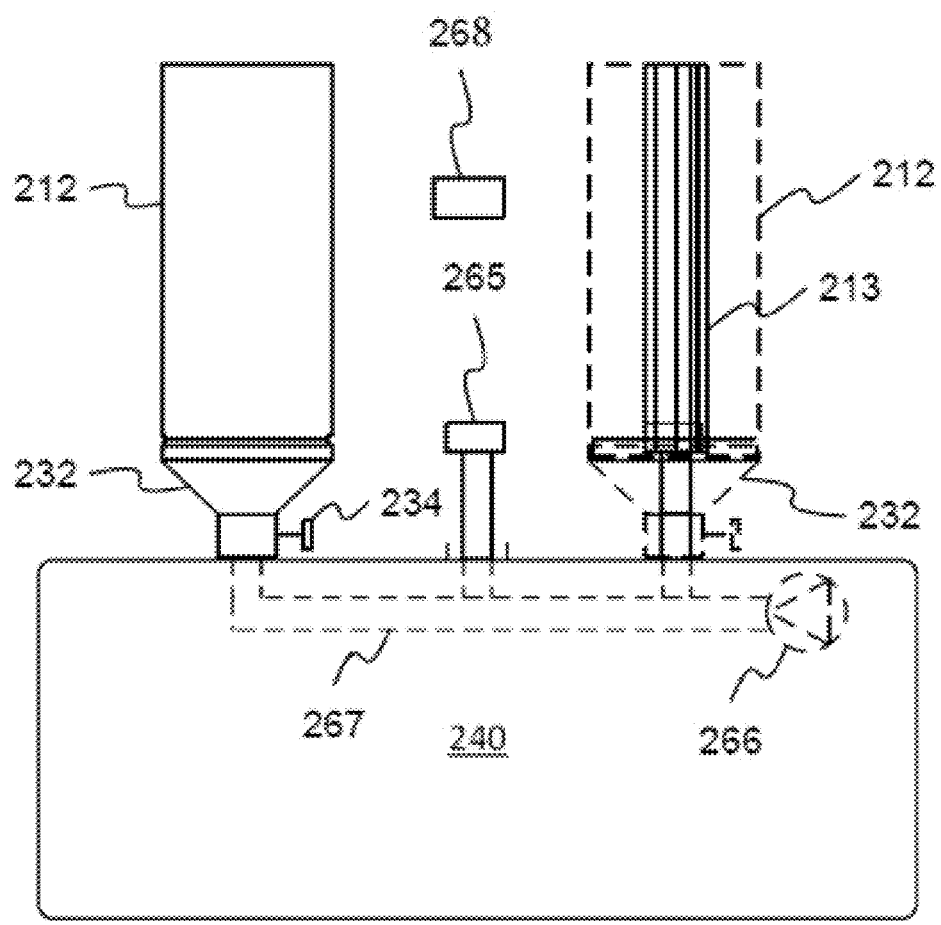
FIG. 4K shows and example of a storage container for the magnetic particles received from bottles.

FIG. 4K shows and example of a storage container 240 for the magnetic particles received from the bottles 212. The valves 234 on the bottles 212 accept a nozzle 265, included in the storage container 240, to seal a manifold 267 to the snorkels 213 in the bottles 212. A blower 266 feeds inert gas through the manifold 267 and into the snorkels 213 to remove magnetic particles from the bottles 212 into the storage container 240. The inert gas may circulate back into the storage chamber 240 after entering one of the bottles 212.

The inert gas may flow out of the snorkels 213 in a tangential/radial flow, as shown in FIG. 4H which is a cross section of a bottle 212 and a snorkel 213. The arrows show the tangential pattern of the inert gas ejected through tangentially-aimed slots in the snorkel 213. The tangential pattern of the inert gas flow may help remove particles from the inside walls of the bottle 212 and facilitate fully emptying the magnetic particles from the bottles 212.

The valve 234 may have a gate configuration, e.g., to permit the entry of the nozzle 265 into the bottle 212. A cover 268 may be place on the nozzle 265 to seal the storage container 240 when the bottles 212 are removed.

Figure 5:
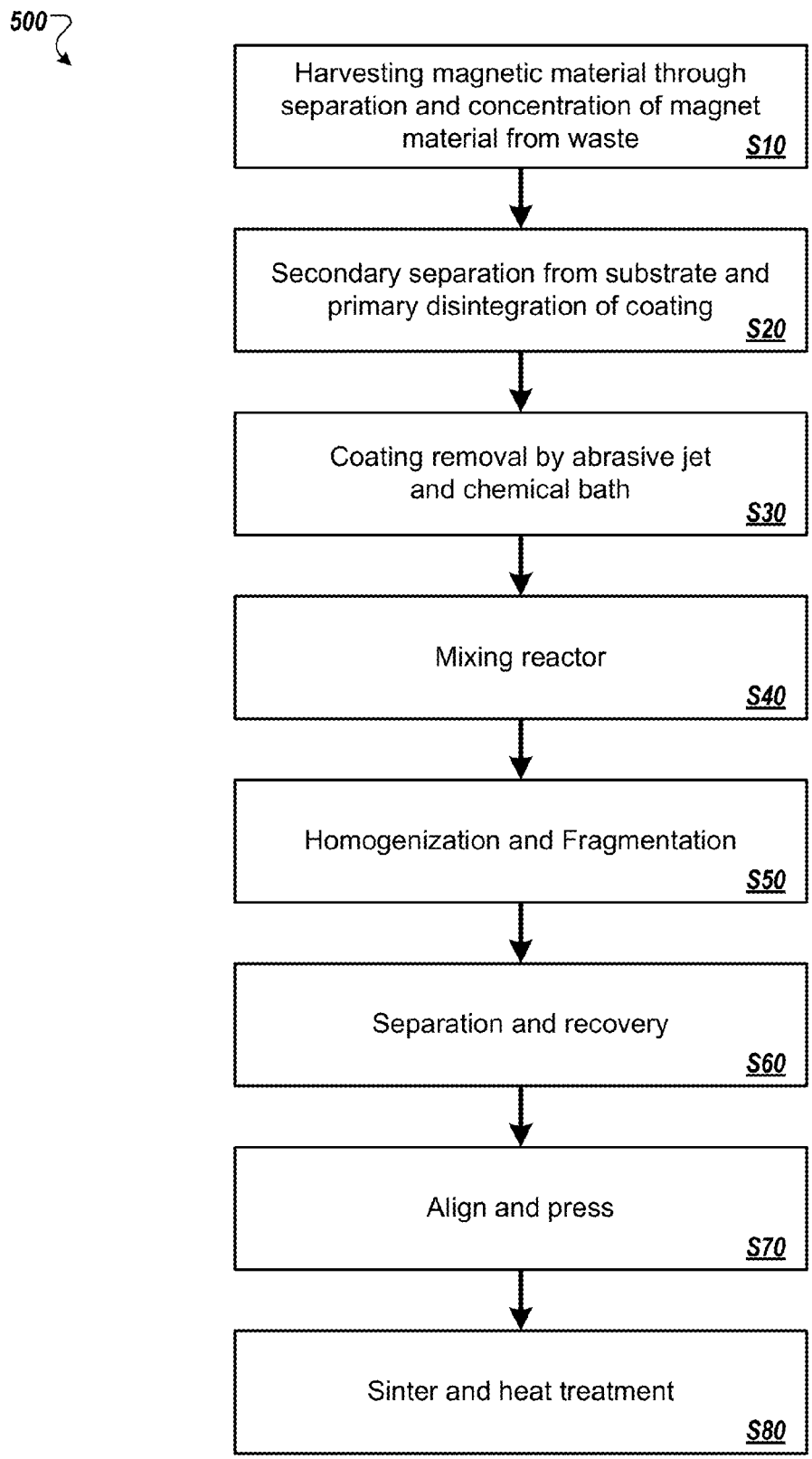
FIG. 5 is an example of a process for recovering waste magnet and magnetic material from products, e.g., manufacturing "bulk", failed/rejected/surplus batches, and/or EOL products, to achieve target properties.

FIG. 5 is an example of a process 500 for recovering waste magnet and magnetic material from products, e.g., manufacturing "bulk", failed/rejected/surplus batches, and/or EOL products, to achieve target properties. The process 500 may be performed using one or more of the systems described above.

At S10, a conveyor orients the products with respect to a cutter and feeds the products through the cutter. The magnet-containing portion, or cut, of the products is separated from the rest of the products and the magnet-containing portion is combined in a batch with other magnet-containing portions "harvested" from the same or similar equipment.

At S20, the magnet-containing portions, or cuts, are conveyed to a system that performs separation, demagnetization, and primary fracturing of coating in which the magnet-containing portions are heated and then cooled to cause the separation of any adhesive on the magnet-containing portions, used to attach magnets to respective substrates, such as parts of a magnetic circuit or assembly, from the magnetic material. This process may substantially recover the entire magnet from the magnet-containing portion or assembly and may not break the recovered magnets further.

In some implementations, the heating and cooling may be effective to disrupt or partly fracture a coating, such as a nickel-copper-nickel coating sometimes used on Nd—Fe—B magnets. Some coatings, such as phosphate, lacquer, or polymer, may be completely destroyed during heating.

The heating and cooling cycles may be repeated multiple times or only once. The system may heat the magnet-containing portions to a temperature around 600° C. and then cool the magnet-containing portions to a temperature around 5° C. Other target temperatures may be used. The heating temperature may be chosen using the Curie temperature of the magnetic material included in the magnet-containing portions, e.g., a temperature greater than the Curie temperature of the magnetic material so that the magnetization of the magnets is lost.

A single batch of magnet-containing portions that the system heats at the same time may include magnets of multiple formulations that have different Curie temperatures. The heating temperature selected may be equal to or greater than the highest Curie temperature for any of the magnetic formulations to ensure that the magnetization of all the different types of magnetic materials is removed.

In some implementations, the heating and cooling are both rapid. In some examples, the temperature remains above the Curie temperature for a predefined minimum time in order to demagnetize the magnetic material. In some implementations, the magnet-containing portions are heated to above the Curie temperature that is held for a predefined minimum time, and then the magnet-containing portions are cooled rapidly. The magnet-containing portions may then be heated again and held for a shorter time and to a lower temperature and then rapidly cooled again. If demagnetization occurs in a first heating and cooling cycle, the same temperature or hold time does not need to be achieved in later cycles but the cycling of hot and cold may be beneficial for removing the magnetic material from the adhesives and/or for fracturing the coating. In some implementations, the system heats the magnet-containing portions at a rate of 10° C./sec or higher, preferably 50-100° C./sec. The system may rapidly cool the magnet-containing portions, for example, at a rate of 100° C./sec, preferably between about 200-1000° C./sec.

The process 500 may be performed on a batch of between about 50 to about 1000 kg of the magnet-containing portions for about 1 hour in a furnace to fully remove non-magnetic material from the magnetic material. The greater the mass of a batch loaded into a furnace, the longer the holding time in the furnace, e.g., because of convection. The holding time in the furnace may be a total time for all of the heating and cooling cycles, e.g., the furnace both heats and cools the magnet-containing portions.

An inert atmosphere may be employed in the furnace or the heating may be performed in air. In some implementations, processing of the magnetic material once any coating is disrupted or removed from the magnetic material may employ inert atmosphere to protect the magnetic material from excessive oxidation.

At S30, the entire coating is removed from the magnetic material. The coating may be removed by mechanical, chemical, and/or other methods. In some examples, the coating is removed by shot blasting or abrasive jet. A chemical bath may follow the shot blasting or abrasive jet. For example, diluted hydrochloric, nitric acid, or other agent effective for removing oxide may be used. The chemical bath may remove an oxide from the surface of the magnetic material.

At S40, the magnetic material, after mechanical and chemical treatment, is placed in a mixing apparatus. The mixing apparatus may subjects the magnetic material to a pressurized hydrogen atmosphere for a predetermined period of time, temperature, rotational speed, etc. For instance, the magnetic material may be processed by the hydrogen mixing reactor shown in FIG. 3B, FIG. 4G, or both or another appropriate mixing apparatus.

In some examples, rare earth transitional elemental additive material may be added to the magnetic material before or after mixing. In some implementations, Nd—Fe—B magnets, e.g., waste magnet and rare earth elemental additive, for example, $Nd_{1-x}Pr_x$, are placed together in a mixing apparatus at a ratio between 99.9:0.1 to 81:19 and are homogeneously blended together. The rare earth transitional elemental additive material may be fragmented separately and added to the waste magnetic material after S40.

The rare earth transitional elemental additive material may be chosen using an elemental analysis of the waste magnetic material composition and a database of restoration formulas determined by experiment and extrapolation to be suitable for achieving a predefined target formulation and magnetic performance or any other appropriate method. For instance, the database may include historical data indicating composition properties of waste magnetic material and rare earth transitional elemental additive material added to the starting material to achieve desired properties for a resulting sintered recycled magnet product.

The magnetic and physical properties of the starting magnetic material may be restored or improved by the addition of certain rare earth transitional elemental additive materials in a predefined proportion during or after reduction of the starting magnetic material through mixing e.g., hydride powder or crushed powder that is then processed into a new sintered recycled magnet. An example of this formulation is 99 parts waste Nd—Fe—B magnets and 1 part Pr, 25 wt. %, /Nd, 75 wt. %, elemental additive and in the case of 2:17-type magnets, which contain $Sm_2Co_{17}$, 1 part of Sm. Another example is 99 parts waste Nd—Fe—B magnets and 1 part Nd, Dy, Co, Cu, and Fe elemental additive. In some implementations, the combination is one of a waste rare earth magnet in major proportion in combination with a rare earth transitional elemental additive or element in minor fraction. In some implementations, the rare earth transitional elemental additive is a combination of Nd and a Lanthanide and another transitional metal. In some implementations, the elemental additive is less than 2% of the combination with the starting magnetic material. In some implementations a Lanthanide may be replaced with Pr.

At S50, the powder is fragmented and homogeneously mixed by suitable means. In some implementations, this is accomplished by jet milling to a target particle size between about 1 to about 4 microns. The powder may be fragmented, homogenized, or both using any appropriate fragmentation apparatus, such as those described in more detail above. In some implementations, steps S40 and S50 may be performed concurrently. In some implementations, instead of adding the rare earth transitional elemental additive material minor fraction to the batch to be hydrogenated, the rare earth material is separately hydrogenated and mixed in at S50. In some examples, the rare earth transitional elemental additives may be milled separately and added after milling of the starting waste magnetic material, e.g., after S50, during which the starting waste magnetic material is preferably divided sufficiently to form a powder in the range of between about 1 to about 50 microns using high pressure e.g., 60 bar.

At S60, larger particles, e.g., about 1 mm, are sieved out of the fragmented material, e.g., a powder oxidized fraction is processed by sieving out larger particles, such as particles between about 500 microns to about 2 mm, from the fine powder. This procedure is effective for removing the oxidized fraction because of the hardness of oxides relative to the major fraction of recovered rare earth magnet material which prevents the oxidized particles from fragmenting into smaller parts. For example, hydrogenation, milling, jet milling, crushing, or another appropriate method, may be less apt to break up oxides leaving their size distribution larger and making possible to eliminate or reduce their proportion in the fine powder by sieving.

At S70, the fine powder is pressed and aligned to form a green compact by filling a press and establishing a magnetic field in the press, and at S80 the green compact is sintered and heat treated to form a recycled sintered magnet product.

Figure 6:
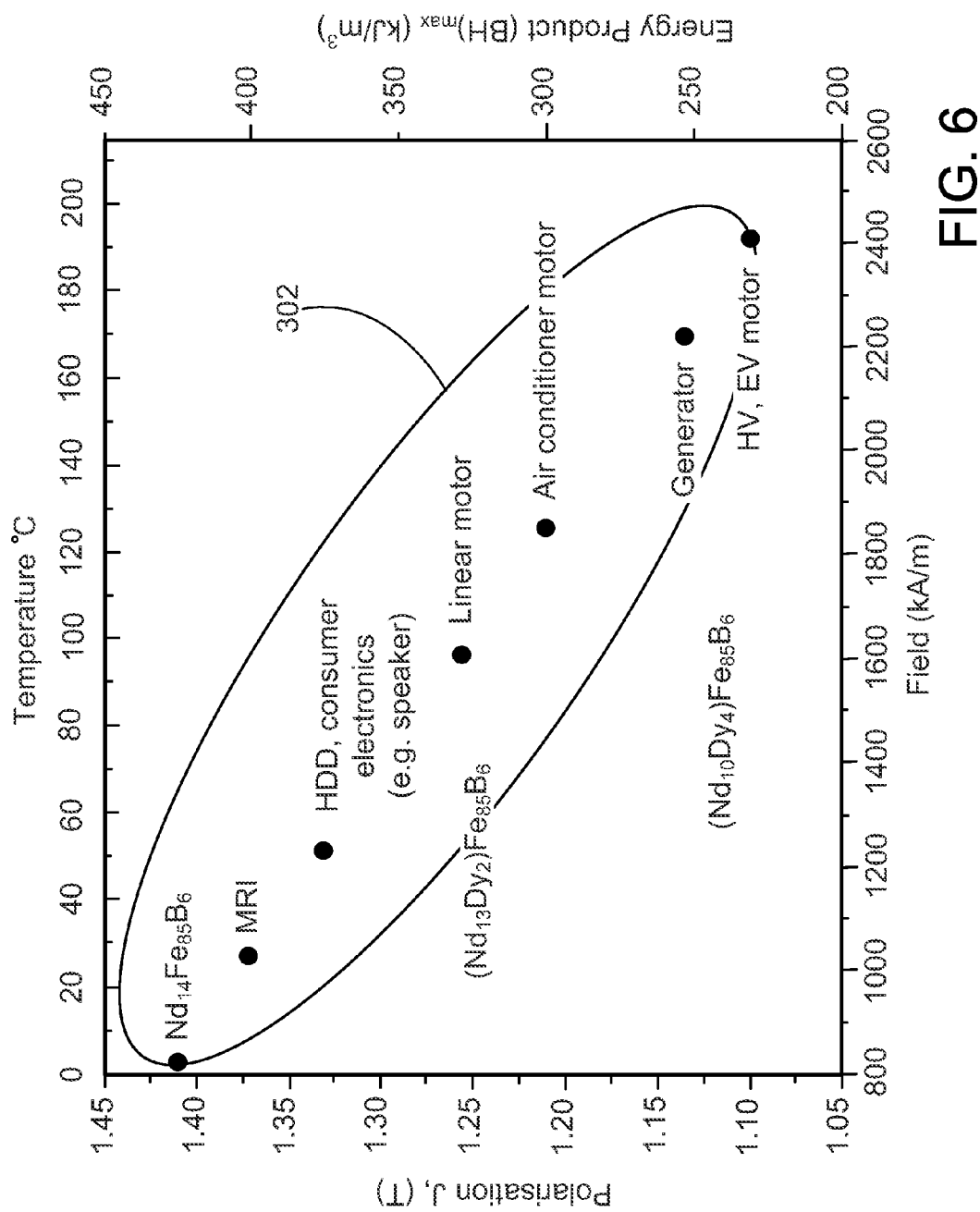
FIG. 6 is a graph that shows an example of property ranges for starting materials which may be obtained as bulk and/or EOL magnets and for recycled magnets.

FIG. 6 is a graph that shows an example of property ranges for starting materials which may be obtained as bulk and/or EOL magnets and for recycled magnets. A bubble 302 drawn onto the graph represents the approximate range of starting materials to which the process 500 can apply. The process 500 may also apply to other starting materials outside of the bubble 302.

Figure 7:
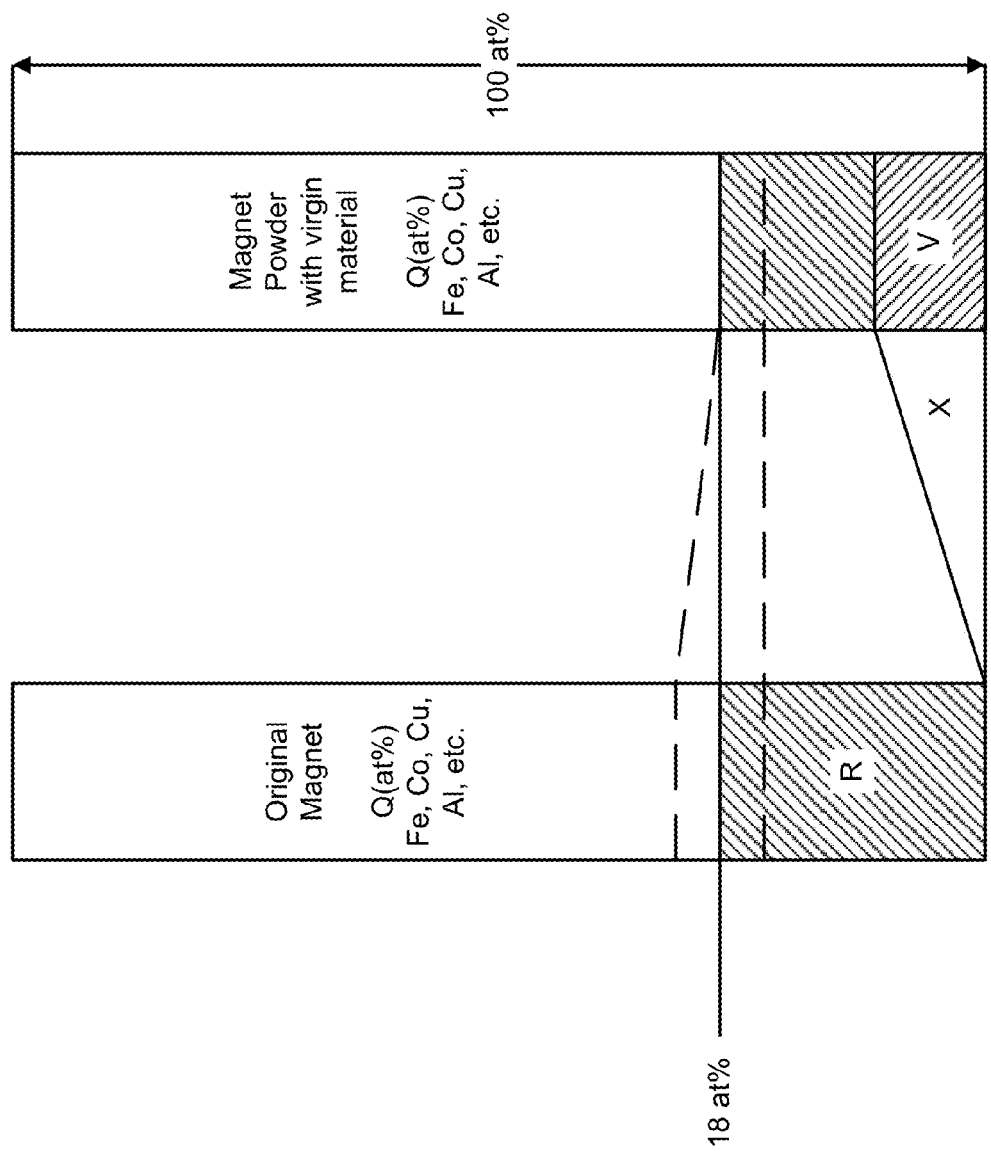
FIG. 7 is a diagram comparing the composition of the original waste magnetic material, shown in the left column, to the finished recycled magnet product, shown in the right column, created by the process.

FIG. 7 is a diagram comparing the composition of the original waste magnetic material, shown in the left column, to the finished recycled magnet product, shown in the right column, created by the process 500. In the starting magnetic material, the composition of rare earth metals may be greater or less than 18 at. %, noted by the "R" region of the left column. An amount of rare earth metals "X" is removed from the starting magnet material during processing. In order for the recycled Nd—Fe—B product to have a composition similar to the original magnet, new rare earth material, i.e., virgin material, must be added.

In FIG. 7, the virgin material is represented by the "V" region and is approximately equal to the amount of rare earth metals removed during processing, or "X." In the finished recycled product, the final percentage of rare earth metals is at least the percentage in the starting magnetic material, but not higher than 18 at. %. If the percentage of rare earth material in the starting magnetic material "R" is as low as the lower of the two dashed lines in the left column, e.g., less than 18 at. %, the final rare earth atomic percentage in the finished recycled magnet product, sown in the right column, is at least equal to the same percentage, as depicted by the lower dashed line carrying over. If, however, the percentage of rare earth metals in the starting magnetic material is greater than 18 at. %, then the atomic percentage in the finished recycled magnet is limited to 18%, as shown by the upper dashed line being capped at 18% in the right column.

In the finished recycled product, the final rare earth atomic percentage is one in which the percentage of each component, Nd, Pr, Dy, Gd, Tb, La, Ce, Yb, Ho, and/or Eu of virgin material is in the range of 0.1 to 19% of its percentage in the original magnet, and the atomic percentage of Nd plus Pr is greater than zero.

Besides the rare earth metals, the remainder of both the starting magnetic material and finished recycled magnets is composed of Fe, Co, Cu, aluminum, and other elements. In the finished recycled product, the following limitations are present: (1) the atomic percentage of Co is not more than 3%; (2) the atomic percentage of Cu is not more than 0.3%; and (3) the combined atomic percentage of Fe and Co is not more than 77%.

Figure 8:
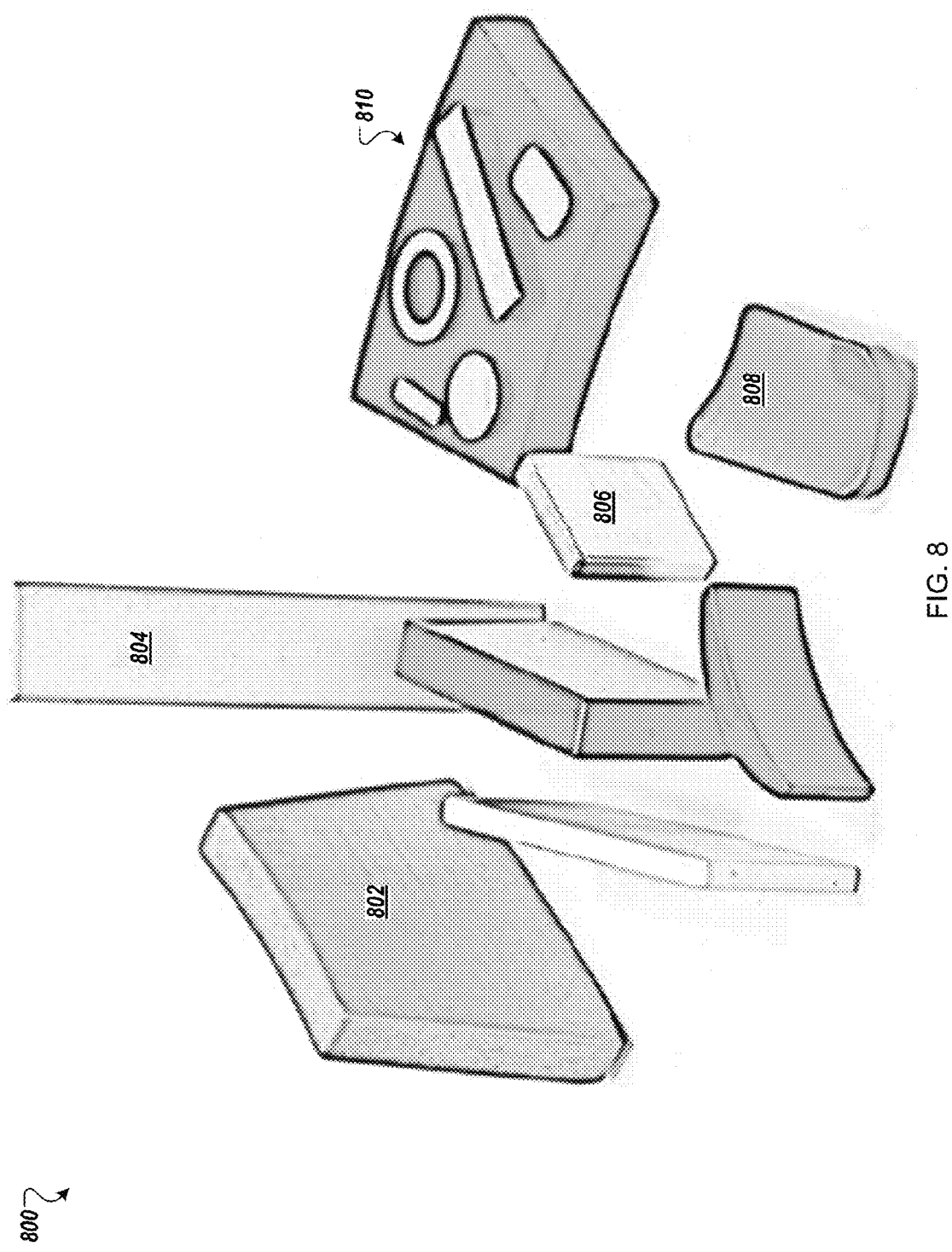
FIG. 8 showing different shapes and coatings of sintered magnets.

FIG. 8 shows different shapes and coatings of sintered magnets 800. Any of the sintered magnets 800 may be used during the recycling process 500. Examples of the coatings of the sintered magnets 800 include phosphate 802, Al 804, NiCuNi 806, Epoxy 808, and Zn 810. For example, the abrasive jet cleaning device 60, shown in FIG. 3A, may remove the coatings from the sintered magnets 800.

The following examples demonstrate that waste magnets from bulk and EOL sources of either uniform or mixed grade and performance, such as remanence (Br) and coercivity (iHc), may be aggregated and processed to form a new Nd—Fe—B recycled magnet with properties tailored to a desired magnetic performance, which is equal to or greater than the properties exhibited by the original starting magnetic material.

EXAMPLE 1

The waste magnets include a fractional mass composition determined by inductively coupled plasma (ICP) analysis and oxygen/carbon elemental analyzer as indicated in Table 1A below. Using a permeameter, the magnetic properties, e.g., remanence, coercivity, etc., of the mixed waste magnets were determined as indicated in Table 1B below. Tables 1A and 1B characterize the waste magnetic material.

About 300 kilograms of mixed grade EOL magnets were held in a muffle furnace and heated high above Curie temperature to 650° C. for 4 hours to demagnetize the EOL magnets. The demagnetized magnets were cool-quenched in water to fracture the coating, and heated in a furnace to 200° C. to dry. The demagnetized magnets were shot blasted for 15 minutes for further removal of Ni—Cu—Ni coating and held in an inert atmosphere. Mass loss of the demagnetized magnets due to removal of coating was less than 5%. The uncoated magnets were chemically processed in diluted HCl.

A reaction rotating mixing vessel was loaded with 100 kg of the uncoated impurity-free waste material and 1% Nd(0.55x+1)Pr(0.45x+1) additive was added. The uncoated impurity-free waste material and the additives were held in the reaction rotating mixing vessel with 2 bar of hydrogen pressure for 4 hours at room temperature, e.g., about 20 to about 25° C. The resulting hydride mixture was then heated in situ to 550-600° C. to partially degas the hydride mixture. 1% Zn stearate was mixed with degassed powder using a roller mill for 30 minutes to lubricate the degassed powder. The degassed powder was jet milled for 1.5 hours under an Argon atmosphere for further homogenization until an average particle size of approximately 2.5 μm or less was achieved. The resulting particles were aligned and pressed, sintered, annealed and magnetized. A sintering temperature between about 1050° C. to about 1100° C. was maintained for 5 hours followed by heat treatment at 600° C. for 3 hours.

ICP, elemental analysis, and permeameter testing was performed on the new Nd—Fe—B sintered product. The compositions and magnetic properties of the new Nd—Fe—B sintered product are shown in Tables 2A and 2B respectively.

In this example, an elemental composition of the rare earth elemental additive RE, e.g., Nd/Pr, was prepared in situ with waste material to form a hydride powder blend. The RE additions substituted for the accounted loss of rare earth oxides or grain boundary surface area phase that was removed from the waste starting material, e.g., during steps S20, S30, S40, S50 described with reference to FIG. 5. The partially degassed rare earth hydride additions may aid in solid state diffusion and/or reduce the amount of oxygen within the hydride powder during sintering, where the crystal grain boundary phase, which is selectively enriched, is formed. In other words, the microstructure of the newly formed magnet is modified compared to the starting material. For instance, the recycling process takes advantage of the restoration and improvement of the grain boundary when the rare earth elemental additive absorbs the $H_2$ component of the process gas forming, e.g. $NdPrH_3$, which is then transformed back to oxygen free NdPr during sintering. Therefore, the grain boundary restoration and reaction with the $Nd_2Fe_{14}B$ component constitutes a newly formed microstructure and elemental composition so that the resulting Nd—Fe—B sintered magnet may exhibit properties equal to or greater than the waste starting material, including Br, iHc, BHmax, or a combination of two or more of these.

In some examples, the rare earth RE additive component may be allowed to diffuse along the grain boundary by restoring and forming the grain boundary rich phase in the resulting Nd—Fe—B magnet with Nd-rich phase alone, and the coercive and remanent force is deteriorated, as described in more detail with reference to Table 3B.

A rare earth proportion of the rare earth RE element from the waste magnet may be replaced by fresh additions in the principal $Nd_2Fe_{14}B$ matrix phase. In some implementations, the rare earth RE additives are sintered together with material from the waste magnets, allowing the rare earth RE component to diffuse and penetrate selectively along the grain boundary. Coercive force comparable to that of the original waste magnet starting material may be recovered or improved in the recycled sintered magnet with the use of very small quantities of new rare earth material. For example, a new recycled Nd—Fe—B product may be manufactured which has superior properties when compared to the starting waste materials.

Magnetic properties are reported in the Tables as BHmax (energy product), iHc (coercivity), and Br (remanence).

TABLE 1A

Objective: ICP Analysis of magnetic material portion of EOL magnets

| Sample | Nd | Pr | Fe | B | Dy | Al | Co | C | O |
|---|---|---|---|---|---|---|---|---|---|
| A-1 | 9.77 | 2.96 | 76.94 | 5.72 | 0.92 | 0.86 | 0.81 | 0.21 | 1.81 |
| A-2 | 9.77 | 2.96 | 77.02 | 5.66 | 0.92 | 0.86 | 0.79 | 0.21 | 1.81 |
| B-1 | 9.65 | 2.95 | 74.95 | 5.56 | 0.90 | 0.84 | 0.78 | 2.63 | 1.74 |
| B-2 | 9.64 | 2.94 | 74.96 | 5.56 | 0.90 | 0.84 | 0.79 | 2.63 | 1.74 |
| C-1 | 9.59 | 2.95 | 77.35 | 5.67 | 1.06 | 0.98 | 0.86 | 0.21 | 1.33 |
| C-2 | 9.54 | 2.94 | 76.69 | 5.69 | 1.05 | 0.97 | 0.68 | 1.12 | 1.32 |
| D-1 | 9.62 | 3.01 | 77.15 | 5.73 | 1.06 | 0.98 | 0.75 | 0.21 | 1.49 |
| D-2 | 9.61 | 2.96 | 77.13 | 5.72 | 1.06 | 0.98 | 0.84 | 0.21 | 1.49 |
| E-1 | 10.89 | 3.44 | 75.06 | 5.76 | 0.54 | 1.85 | 0.12 | 0.43 | 1.91 |
| E-2 | 10.88 | 3.43 | 75.11 | 5.76 | 0.53 | 1.83 | 0.12 | 0.43 | 1.91 |

TABLE 1B

Objective: Magnetic Properties of EOL magnets analyzed in Table 1A

| Sample | Br (T) | iHc (kA/m) | BHmax (kJ/m³) | Density (g/cm³) |
|---|---|---|---|---|
| A-1 | 1.22 | 1580 | 280 | 7.54 |
| B-1 | 1.23 | 1570 | 285 | 7.57 |
| C-1 | 1.20 | 1680 | 270 | 7.52 |
| D-1 | 1.20 | 1670 | 270 | 7.54 |
| E-1 | 1.22 | 1410 | 275 | 7.38 |

TABLE 2A

Objective Mixed: ICP Analysis of recycled magnet

| Sample | Additive | Nd | Pr | Fe | B | Dy | Al | Co | C | O |
|---|---|---|---|---|---|---|---|---|---|---|
| A-1 | 1% Nd25 Pr75 | 10.74 | 3.26 | 75.62 | 5.81 | 0.91 | 0.80 | 0.75 | 0.60 | 1.51 |
| A-2 | 1% Nd25 Pr75 | 10.74 | 3.26 | 75.62 | 5.81 | 0.91 | 0.82 | 0.73 | 0.60 | 1.51 |
| A-3 | 1% Nd25 Pr75 | 10.72 | 3.25 | 75.32 | 5.79 | 0.90 | 0.80 | 0.79 | 0.60 | 1.83 |
| A-4 | 1% Nd25 Pr75 | 10.72 | 3.25 | 75.35 | 5.79 | 0.90 | 0.80 | 0.76 | 0.60 | 1.83 |

TABLE 2B

Objective Mixed: Magnetic Properties of recycled magnet

| Sample | Additive | Br (T) | iHc (kA/m) | BHmax (kJ/m³) | Density (g/cm³) |
|---|---|---|---|---|---|
| A-1 | 1% Nd25 Pr75 | 1.23 | 1730 | 290 | 7.61 |
| A-2 | 1% Nd25 Pr75 | 1.23 | 1730 | 290 | 7.61 |
| A-3 | 1% Nd25 Pr75 | 1.24 | 1720 | 290 | 7.61 |
| A-4 | 1% Nd25 Pr75 | 1.25 | 1715 | 295 | 7.61 |

EXAMPLE 2

EOL magnet starting material was supplied in magnetized form. The EOL magnets were initially attached to an Fe backing within EOL product. The magnets were demagnetized and separated from the Fe backing using a cyclic heating process described in more detail above. The recycling steps disclosed in Example 1 were used to process the mixed EOL magnets and create new fully dense Nd—Fe—B sintered magnet product.

1% of additives, e.g., $Nd_x/Pr_y$, were added to the waste magnet as indicated in the Additive column shown in tables 3A and 3C. The waste magnets were characterized by ICP, elemental analysis, and permeameter. The compositions and magnetic properties of the starting waste material and new Nd—Fe—B sintered product are shown in Tables 3A and 3B respectively and tables 3C and 3D respectively.

Magnetic properties and corresponding densities are reported in the Tables 3A to 5B as BHmax (energy product), iHc (coercivity), and Br (remanence).

TABLE 3A

Objective: ICP Elemental Analysis, Starting Material and Recycled Magnets

| Sample | Additive | Nd | Fe | B | Dy | Al | Pr | C | O |
|---|---|---|---|---|---|---|---|---|---|
| Starting Material | n/a | 10.50 | Bal. | 6.92 | 0.39 | 0.52 | 3.04 | 0.31 | 2.00 |
| B-1 | Nd pure | 11.39 | Bal. | 6.85 | 0.39 | 0.52 | 3.01 | 0.31 | 1.98 |
| B-2 | Nd95 Pr5 | 11.34 | Bal. | 6.85 | 0.39 | 0.52 | 3.06 | 0.31 | 1.98 |
| B-3 | Nd90 Pr10 | 11.29 | Bal. | 6.85 | 0.39 | 0.52 | 3.11 | 0.31 | 1.98 |
| B-4 | Nd85 Pr15 | 11.23 | Bal. | 6.85 | 0.39 | 0.52 | 3.16 | 0.31 | 1.98 |
| B-5 | Nd75 Pr25 | 11.13 | Bal. | 6.85 | 0.39 | 0.52 | 3.26 | 0.31 | 1.98 |
| B-6 | Nd50 Pr50 | 10.89 | Bal. | 6.85 | 0.39 | 0.52 | 3.51 | 0.31 | 1.98 |
| B-7 | Pr pure | 10.40 | Bal. | 6.85 | 0.39 | 0.52 | 4.00 | 0.31 | 1.98 |

TABLE 3B

Objective iHc: Magnetic Properties of Starting and Recycled Magnets

| Sample | Additive | Br (T) | iHc (kA/m) | BH(max) (kJ/m³) | Density (g/cm³) |
|---|---|---|---|---|---|
| Starting Material | n/a | 1.27 | 1160 | 310 | 7.45 |
| B-1 | Nd pure | 1.23 | 1130 | 290 | 7.50 |
| B-2 | Nd95Pr5 | 1.26 | 1200 | 305 | 7.53 |
| B-3 | Nd90Pr10 | 1.26 | 1230 | 305 | 7.53 |
| B-4 | Nd85Pr15 | 1.26 | 1260 | 305 | 7.53 |
| B-5 | Nd75Pr25 | 1.26 | 1315 | 305 | 7.53 |
| B-6 | Nd50Pr50 | 1.26 | 1335 | 305 | 7.53 |
| B-7 | Pr pure | 1.25 | 1355 | 305 | 7.53 |

TABLE 3C

Objective: ICP Elemental Analysis, Starting Material and Recycled Magnets

| Sample | Additive | Nd | Fe | B | Dy | Al | Pr | C | O |
|---|---|---|---|---|---|---|---|---|---|
| Starting Material | n/a | 10.50 | Bal. | 6.92 | 0.39 | 0.52 | 3.04 | 0.31 | 2.00 |
| B-8 | 1% Nd75Pr25 | 11.10 | Bal. | 6.85 | 0.39 | 0.52 | 3.26 | 0.31 | 1.98 |

TABLE 3D

Objective iHc: Magnetic Properties of Starting and Recycled Magnets

| Sample | Additive | Br (T) | iHc (kA/m) | BH(max) (kJ/m³) | Density (g/cm³) |
|---|---|---|---|---|---|
| Starting Material | n/a | 1.26 | 1034 | 305 | 7.45 |
| B-8 | 1% Nd75 Pr25 | 1.31 | 1034 | 331 | 7.56 |

EXAMPLE 3

The waste starting material magnets were characterized by ICP and permeameter, see Tables 4A and 4B respectively. 0.5 to 8% of the Nd, Dy, Co, Cu and Fe additives were added to the waste magnet as indicated in the Additive column of Tables 5A and 5B. The compositions and magnetic properties of the new Nd—Fe—B sintered product are shown in Tables 5A and 5B respectively.

TABLE 4A

Analysis of waste starting material

| Sample | Nd | Fe | B | Dy | Tb | Al | Cu | Co | Pr | GA | C | O |
|---|---|---|---|---|---|---|---|---|---|---|---|---|
| A-1 | 10.15 | Bal. | 5.88 | 0.32 | 0.17 | 0.38 | 0.9 | 0.81 | 3.26 | 0.09 | 0.32 | 0.97 |

TABLE 4B

Magnetic Properties of waste starting material

| Sample | Br (T) | iHc (kA/m) | BH(max) (kJ/m³) | Density (g/cm³) |
|---|---|---|---|---|
| A-1 | 1.43 | 780 | 395 | 7.5 |

TABLE 5A

Objective iHc: ICP Analysis of recycled magnets

| Sample | Additive | Nd | Fe | B | Dy | Tb | Al | Cu | Co | Pr | Ga | C | O |
|---|---|---|---|---|---|---|---|---|---|---|---|---|---|
| C-1 | 0.5 at % NdDyCoCuFe | 10.09 | Bal. | 5.88 | 0.42 | 0.17 | 0.38 | 0.10 | 0.90 | 3.18 | 0.07 | 0.32 | 1.00 |
| C-2 | 1.0 at % NdDyCoCuFe | 10.09 | Bal. | 5.94 | 0.52 | 0.17 | 0.41 | 0.11 | 0.99 | 3.16 | 0.07 | 0.32 | 1.00 |
| C-3 | 2.0 at % NdDyCoCuFe | 10.10 | Bal. | 5.96 | 0.75 | 0.17 | 0.39 | 0.13 | 1.17 | 3.14 | 0.07 | 0.32 | 1.00 |
| C-4 | 3.0 at % NdDyCoCuFe | 10.15 | Bal. | 5.92 | 0.94 | 0.17 | 0.41 | 0.17 | 1.37 | 3.15 | 0.07 | 0.31 | 1.10 |
| C-5 | 5.0 at % NdDyCoCuFe | 10.31 | Bal. | 5.99 | 1.38 | 0.17 | 0.39 | 0.25 | 1.68 | 3.19 | 0.07 | 0.33 | 1.10 |
| C-6 | 8.0 at % NdDyCoCuFe | 10.50 | Bal. | 6.07 | 2.05 | 0.18 | 0.40 | 0.35 | 2.35 | 3.23 | 0.07 | 0.32 | 1.10 |

TABLE 5B

Objective iHc: Magnetic Properties of Recycled Magnets

| Sample | Additive | Br (T) | iHc (kA/m) | BH(max) (kJ/m³) | Density (g/cm³) |
|---|---|---|---|---|---|
| C-1 | 0.5 at % NdDyCoCuFe | 1.42 | 1050 | 395 | 7.6 |
| C-2 | 1.0 at % NdDyCoCuFe | 1.38 | 1200 | 370 | 7.6 |
| C-3 | 2.0 at % NdDyCoCuFe | 1.33 | 1660 | 345 | 7.6 |
| C-4 | 3.0 at % NdDyCoCuFe | 1.29 | 1880 | 325 | 7.6 |
| C-5 | 5.0 at % NdDyCoCuFe | 1.24 | 2094 | 295 | 7.6 |
| C-6 | 8.0 at % NdDyCoCuFe | 1.16 | 2431 | 256 | 7.6 |

From Tables 2B and 3B, it can be observed that the Nd/Pr elemental additives can be used to manipulate recovery of remanence and augment the coercivity for the resulting recycled sintered magnet. Specifically, the lower the purity of Nd in the elemental additives, greater coercivity is recovered for the resulting recycled sintered magnet. As more Pr is added to the elemental additives—corresponding to a decrease in percentage of Nd present in the elemental additives—coercivity increases, though remanence slightly decreases, for the resulting recycled sintered magnet.

Similarly, coercivity and remanence of recycled sintered magnets can be manipulated by altering the percentage of the Nd, Dy, Co, Cu and Fe additive, shown in Table 5B. For example, from Table 5B, it can be observed that as the percentage of additive increases, corresponding to an increase in coercivity, remanence decreases. Thus, a low percentage of additive, such as 0.5% additive, may result in full restoration of remanence, whereas a higher percentage of additive, such as 8% additive, may result in deterioration of remanence for the resulting recycled sintered magnet. With a higher percentage of additives there is at least about 30% to about 80% increase in coercive values, see Table 5B, which may be achieved for the new recycled sintered Nd—Fe—B product when compared to waste starting martial in Table 4B.

The waste magnets that are recycled fit a range of possible compositions. For instance, the waste magnet compositions may include a first magnet waste material of Fe of at least 72%, Nd in the range of 7-20%, Pr of at least 2%, B of at least 5.6%, and Al of at least 0.1%. In some implementations, the first magnet waste material includes at least one of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%. In some implementations, the first magnet waste material includes at least two of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%. In some implementations, the first magnet waste material includes at least three of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%.

In some implementations, the first magnet waste material includes at least four of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%. In some implementations, the first magnet waste material includes at least five of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%. In some implementations, the first magnet waste material includes at least six of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%.

In some implementations, the first magnet waste material includes at least seven of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%. In some implementations, the first magnet waste material includes at least eight of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%. In some implementations, the first magnet waste material includes at least nine of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%.

In some implementations, some of the above implementations include at least one of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%. In some implementations, some of the above implementations include at least one of Dy between 0 and 5%; Co between 0 and 4%; Cu between 0 and 0.3%; Tb between 0 and 2.07%; Ga between 0 and 0.19%; Gd between 0 and 1.25%; Ti between 0 and 0.14%; Zr between 0 and 0.3%; and Ni between 0 and 0.3%.

In some implementations, the magnet waste material includes at least one of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%. In some implementations, the magnet waste material includes at least two of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%. In some implementations, the magnet waste material includes at least three of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%.

In some implementations, the magnet waste material includes at least four of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%. In some implementations, the magnet waste material includes at least five of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%. In some implementations, the magnet waste material includes at least six of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%.

In some implementations, the magnet waste material includes at least seven of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%. In some implementations, the magnet waste material includes at least eight of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%. In some implementations, the magnet waste material includes at least nine of Dy between 0.1 and 5%; Co between 0.1 and 4%; Cu between 0.1 and 0.3%; Tb between 0.1 and 2.07%; Ga between 0.01 and 0.19%; Gd between 0.01 and 1.25%; Ti between 0.01 and 0.14%; Zr between 0.01 and 0.3%; and Ni between 0.01 and 0.3%.

In some implementations, the waste magnet composition described herein contains trace amounts of one or more of Dy, Co, Cu, Tb, Ga, Gd, Ti, Zr, Ni or combinations thereof. In some implementations, the waste magnet composition described herein contains impurities of one or more of Dy, Co, Cu, Tb, Ga, Gd, Ti, Zr, Ni or combinations thereof. In some implementations, the waste magnet composition described herein contains less than about 0.1%, 0.2%, 0.3%, 0.4%, 0.5%, or 1% of one or more of Dy, Co, Cu, Tb, Ga, Gd, Ti, Zr, Ni or combinations thereof. In some implementations, the waste magnet compositions described herein do not contain one or more of Dy, Co, Cu, Tb, Ga, Gd, Ti, Zr, Ni or combinations thereof. In some implementations, the waste magnet compositions described herein comprise, consist essentially of, or consist of any of the ranges provided herein.

Table 6 shows combinations of materials that define other possible recycled magnet materials according to some implementations.

TABLE 6

Recycled magnet composition envelope

| Component | At least % | Not more than % |
|---|---|---|
| Fe | 72 | 83 |
| Nd | 7 | 25 |
| Pr | 2 | 4 |
| B | 5.6 | 6.4 |
| Al | 0.1 | 2.9 |
| Dy | 0 | 5 |
| Co | 0 | 4 |
| Cu | 0 | 0.3 |
| Tb | 0 | 2.07 |
| Ga | 0 | 0.19 |
| Gd | 0 | 1.25 |
| Ti | 0 | 0.14 |
| Zr | 0 | 0.3 |
| Ni | 0 | 0.3 |

In some implementations, waste magnet material, whose composition ranges are defined in the tables above, may be combined with an amount of a rare earth elemental additive, before, during or after mixing to produce an optimum magnetic powder mixture, with about 0.5 to about 8 at % of the magnetic powder from the rare earth elemental additive. In some implementations, the amount of elemental additives is such that at least one of the elemental components of the rare earth elemental additives is at least the same amount of the same element that is lost from the waste magnet starting material during the initial processing steps. In some implementations, the amount of elemental additives is such that at least one of the elemental components of the rare earth elemental additives is equal to an amount of the same element that is lost from the waste magnet starting material during the initial processing steps and further processing steps. To determine the amount of lost material, a sample of waste magnet starting material can be processed and analyzed using ICP to determine the change in rare earth elemental constituents. For example, the reduction in concentration of elemental Nd may be 0.7%. In this case, a 1% added Nd(0.70)Pr(0.25)(0.05 other materials) elemental additive would be effective to restore the original grain boundary rich phase in the recovered Nd—Fe—B sintered magnet product. In some examples, when a reduction in the concentration of Nd is 0.7%, twice the elemental additive may be added, e.g., 2%, such that the total amount of Nd, Pr, and Dy does not exceed 18% in the resulting Nd—Fe—B sintered product.

The following formulas further describe some implementations: R=s(Nd)+s(Pr)+s(Dy) in waste magnet starting material; T=f(Nd)+f(Pr)+f(Dy) in final Nd—Fe—B product, as defined in paragraph 19; and virgin material added V=Nd[p]+Pr[q]+Dy[r], where $0.1 \leq p+q+r \leq 19$ at. % of final product and $T \geq \min(R, 18 \text{ at. \%})$. For illustrative purposes, consider the following example: If the atomic percentage values for Nd, Pr, and Dy in an waste magnet starting material are 9.77, 2.96, and 0.92, respectively, then substituting the corresponding values into the formula R=s(Nd)+s(Pr)+s(Dy) yields R=9.77+2.96+0.92, or R=13.65. In the same example, the atomic percentage values for Nd, Pr, and Dy in the new recycled Nd—Fe—B sintered magnet might be 10.74, 3.26, and 0.91, respectively. Upon substituting the values of the new recycled Nd—Fe—B sintered magnet into the formula T=s(Nd)+s(Pr)+s(Dy), T then equals 10.74+3.26+0.91, or T=14.91. If, in the same example, virgin material is added during the recycling process, and the virgin material contains atomic percentage values of 0.2, 0.3, and 0.4 for Nd, Pr, and Dy, respectively, the formula V=Nd[p]+Pr[q]+Dy[r] yields V=0.2+0.3+0.4, or V=0.9. The formula for the virgin material, or V, is subject to two constraints: $0.1 \leq p+q+r \leq 19\%$ of final product and $T \geq \min(R, 18 \text{ at. \%})$. In our example, p+q+r=0.9%, which satisfies the first constraint—that the value of p+q+r must be greater than or equal to 0.1% and less than or equal to 19%. This example also satisfies the second constraint for the formula for the virgin material: T is greater than or equal to the minimum of the set of R or 18. In this example, T is 14.91 and the minimum of the set of R or 18 is R, which is 13.65, so T is greater than or equal to the minimum of the set of R or 18.

In some implementations, V=Nd[p]+Pr[q]+Dy[r], where $0.1 \leq p+q+r \leq 15$ at. % of final product and $T \geq \min(R, 18 \text{ at. \%})$. In some implementations, V=Nd[p]+Pr[q]+Dy[r], where $0.1 \leq p+q+r \leq 12$ at. % of final product and $T \geq \min(R, 18 \text{ at. \%})$. In some implementations, V=Nd[p]+Pr[q]+Dy[r], where $0.1 \leq p+q+r \leq 8$ at. % of final product and $T \geq \min(R, 18 \text{ at. \%})$. In some implementations, V=Nd[p]+Pr[q]+Dy[r], where $0.1 \leq p+q+r \leq 5$ at. % of final product and $T \geq \min(R, 18 \text{ at. \%})$. In some implementations, V=Nd[p]+Pr[q]+Dy[r], where $0.1 \leq p+q+r \leq 3$ at. % of final product and $T \geq \min(R, 18 \text{ at. \%})$. In some implementations, V=Nd[p]+Pr[q]+Dy[r], where $0.1 \leq p+q+r \leq 2$ at. % of final product and $T \geq \min(R, 18 \text{ at. \%})$. In some implementations, V=Nd[p]+Pr[q]+Dy[r], where $0.1 \leq p+q+r \leq 1$ at. % of final product and $T \geq \min(R, 18 \text{ at. \%})$.

In some implementations, X is at. % RE (Nd, Pr, Dy) removed from original magnet, and $p+q+r \geq X$. In some implementations, the additive is such that in the final recycled Nd—Fe—B sintered product, where f is a fraction by at % of recycled Nd—Fe—B sintered, f(Nd)+f(Pr)>0. In some implementations, $f(Nd)+f(Pr)+f(Dy) \leq 18$. In some implementations, $f(Co) \leq 3$. In some implementations, $f(Cu) \leq 0.3$. In some implementations, $f(Fe)+f(Co) \leq 77$. In some implementations, $f(Dy)+f(Nd)+f(Pr) \geq R$.

In some implementations, the elemental additions are Nd[0.1-19 at. %*s(Nd), x]Pr[0.1-19 at. %*s(Pr), y]Dy[0.1-19%*s(Dy), z]Co[0, d]Cu[0, e]Fe[0, f], where [m,n] means a range from minimum m and maximum n; s(t) is the atomic percent of element t in starting composition; f(t) is the atomic percent of element t in final composition; x=18−[81, 99.9] at. %*(s(Nd)+s(Pr)+s(Dy)); y=18−[81, 99.9] at. %*(s(Nd)+s(Pr)+s(Dy)); z=18−[81, 99.9] at. %*(s(Nd)+s(Pr)+s(Dy)); d=3−[81, 99.9] at. %*s(Co); e=0.3−[81, 99.9] at. %* s(Cu); f=77−[81, 99.9] at. %*(s(Fe)+s(Co)).

In some implementations, (i) virgin material, e.g., $Nd_p$-$Pr_q Dy_r$, need be in the range of $0.1 \leq p+q+r \leq 19$ at. % of final product, and $T \geq \min(R, 18)$, where $T=f(Nd)+f(Pr)+f(Dy)$ and $R=s(Nd)+s(Pr)+s(Dy)$; (ii) $p+q+r \geq X$, where X is at. % RE (Nd, Pr, Dy) removed from original magnet; (iii) $T \leq 18\%$; (iv) $f(Nd)+f(Pr)>0$, where f is an at. % fraction of the final product; (v) $f(Nd)+f(Pr)+f(Dy)<=18$; (vi) $f(Co)<=3$; (vii) $f(Cu)<=0.3$; (viii) $f(Fe)+f(Co)<=77$; and (ix) $f(Dy)+f(Nd)+f(Pr)>=R$.

In some implementations, a method provides for the addition of 0.1 to 19 wt. % of one or more rare earth elemental additives to a composition or method described herein. In another aspect, a method provides for the addition of about 0.1 wt. %, about 0.2 wt. %, about 0.3 wt. %, about 0.4 wt. %, about 0.5 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, or about 19 wt. % of one or more elemental additions or a combination of one or more elemental additions to a composition or method described herein. In yet another aspect, a method provides for the addition of about 0.1-0.5 wt. %, about 0.1-1 wt. %, about 0.5-1 wt. %, about 1-2 wt. %, about 1-3 wt. %, about 1-5 wt. %, about 1-8 wt. %, about 1-12 wt. %, bout 1-15 wt. %, about 1-19 wt. % about 2-4 wt. %, about 2-6 wt. %, about 2-12 wt. %, about 2-19 wt. %, about 3-5 wt. %, about 3-8 wt. %, about 3-15 wt. %, and about 3-19 wt. % of one or more elemental additions or a combination of one or more elemental additions to a composition or method described herein.

In some implementations, inevitable impurities may be combined with the identified materials.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatuses, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 9:
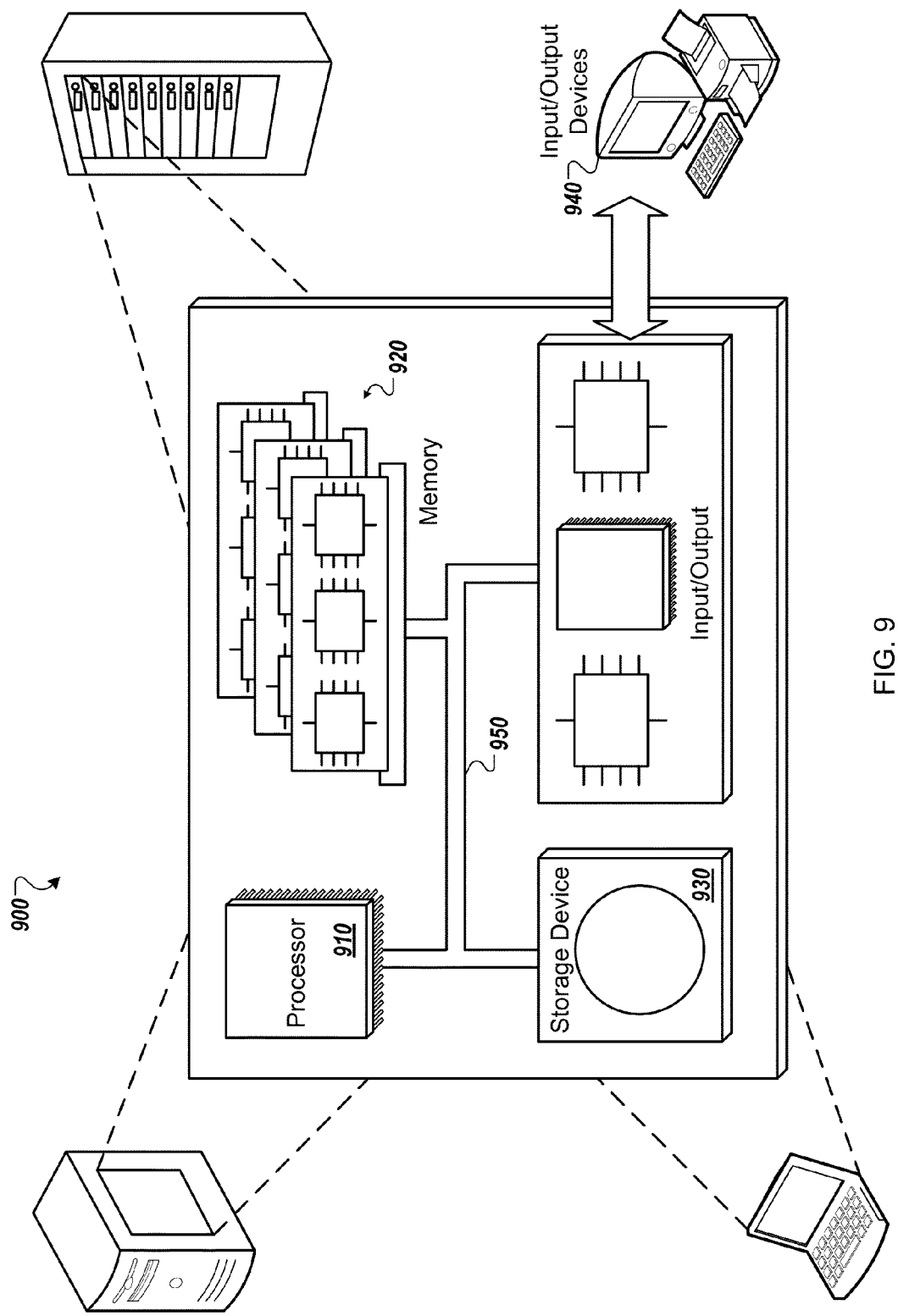
FIG. 9 is a block diagram of a computing system that can be used in connection with computer-implemented methods described in this document.

An example of one such type of computer is shown in FIG. 9, which shows a schematic diagram of a generic computer system 900. The system 900 can be used for the operations described in association with any of the computer-implement methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for manufacturing a recycled Nd—Fe—B permanent magnet comprising:

demagnetizing magnetic material from a waste magnet assembly by cyclic heating And cooling of the magnetic material, fragmenting adhesives attached to the magnetic material, cracking coating layers of the magnetic material, and subjecting the magnetic material to at least one of: a) a mechanical treatment or b) a chemical treatment, to remove the coating layers and prepare the magnetic material without impurities;

fragmenting the demagnetized magnetic material to form a powder;

mixing the powder with a) a rare earth material R that comprises between 0.1 to 1 at. % of the total mixture and b) an elemental additive A to produce a homogeneous powder, wherein the rare earth material R comprises at least one of: i) Nd or ii) Pr with a ratio of 75 wt. % Nd to 25 wt. % Pr, and the elemental additive A comprises at least one of: i) Dy, ii) Co, iii) Cu, iv) Fe; and sintering and magnetizing the homogenous powder to form a recycled Nd—Fe—B magnetic product that comprises 1.98 at. % oxygen or less and has a remanence and a coercivity at least the same as a waste magnet part from the waste magnet assembly.

2. The method of claim 1 comprising performing the fragmenting and the mixing concurrently.

3. The method of claim 1 wherein fragmenting the demagnetized magnetic material comprises fragmenting the demagnetized magnetic material to an average particle size between 1 to 4 microns.

4. The method of claim 1 wherein fragmenting the demagnetized magnetic material to form the powder comprises removing particles with a particle fraction size bigger than an average size of particles in the demagnetized magnetic material from the demagnetized magnetic material to obtain 1.98 at. % oxygen or less in the demagnetized magnetic material.

5. The method of claim 4 wherein removing, from the demagnetized magnetic material, particles with the particle fraction size bigger than the average size of particles in the demagnetized magnetic material to obtain 1.98 at. % oxygen or less in the demagnetized magnetic material comprises removing particles in an inert atmosphere.

6. The method of claim 5, wherein removing particles in an inert atmosphere comprises removing particles in argon.

7. The method of claim 4 wherein removing, from the demagnetized magnetic material, particles with the particle fraction size bigger than the average size of particles in the demagnetized magnetic material to obtain 1.98 at. % oxygen or less in the demagnetized magnetic material comprises sieving.

8. The method of claim 1 comprising:
mixing the homogenous powder with another element selected from the elemental additive A.

9. The method of claim 1 comprising:
harvesting the magnetic material from one or more magnet assemblies by:
separating a waste magnet part from a non-magnet part included in the magnet assemblies; and
extracting the waste magnet part from the non-magnet part, wherein the magnetic material comprises the waste magnet part.

10. The method of claim 1 wherein fragmenting the demagnetized magnetic material to form the powder comprises fragmenting the demagnetized magnetic material to form the powder with an average particle size between about 1 micron to about 2 millimeters, the method comprising:
further fragmenting the powder to an average particle size between about 1 to about 4 microns; and
homogenizing the powder.

11. The method of claim 10 wherein:
homogenizing the powder comprises homogenizing the powder that comprises an average particle size between about 1 micro to about 2 millimeters; and
mixing the powder with a) the rare earth material R that comprises between 0.1 to 1 at. % of the total mixture and b) the elemental additive A to produce the homogeneous powder comprises mixing the powder with an average particle size between about 1 to about 4 micros with a) the rare earth material R and b) the elemental additive A to produce the homogenous powder.

12. The method of claim 10 wherein:
mixing the powder with a) the rare earth material R that comprises between 0.1 to 1 at. % of the total mixture and b) the elemental additive A to produce the homogeneous powder comprises mixing the powder with an average particle size between about 1 micron to about 2 millimeters with a) the rare earth material R and b) the elemental additive A to produce the homogenous powder; and
homogenizing the powder comprises homogenizing the powder that comprises an average particle size between about 1 to about 4 microns.

13. The method of claim 1 comprising:
fragmenting the rare earth material R and the elemental additive A separately from fragmenting the demagnetized magnetic material to form the powder, wherein mixing the powder with a) the rare earth material R that comprises between 0.1 to 1 at. % of the total mixture and b) the elemental additive A to produce the homogeneous powder comprises mixing the powder with a) the fragmented rare earth material R and b) the fragmented elemental additive A to produce the homogeneous powder.

14. The method of claim 1 where sintering and magnetizing the homogenous powder to form a recycled Nd—Fe—B magnetic product comprises:
adding a lubricant to the homogenous powder;
compacting the homogenous powder to form a green compact;
sintering the green compact between about 1000° C. to about 1100° C.;
heat treating the sintered green compact between about 490° C. to about 950° C.; and
magnetizing the heat treated green compact to an inert atmosphere below 15° C. to form the recycled Nd—Fe—B magnetic product.

15. The method of claim 1, wherein an atomic percentage of Co in the recycled Nd—Fe—B magnetic product is less than or equal to 3 at. %.

16. The method of claim 1, wherein an atomic percentage of Cu in the recycled Nd—Fe—B magnetic product is less than or equal to 0.3 at. %.

17. The method of claim 1, wherein a combined atomic percentage of Fe and Co in the recycled Nd—Fe—B magnetic product is less than or equal to 77 at. %.

18. The method of claim 1, wherein a combined atomic percentage of Nd, Pr, and Dy in the recycled Nd—Fe—B magnetic product is greater than or equal to a combined atomic percentage of Nd, Pr, and Dy in a waste magnet part from the waste magnet assembly.

19. The method of claim 1, wherein a combined atomic percentage of Nd, Dy, and Pr in the recycled Nd—Fe—B magnetic product is less than or equal to 18 at. %.

20. The method of claim 1, wherein the coercivity of the recycled Nd—Fe—B magnetic product is between about 0 to about 20% greater than the coercivity of a waste magnet part from the waste magnet assembly.

21. The method of claim 1, wherein:
mixing the powder with a) the rare earth material R that comprises between 0.1 to 1 at. % of the total mixture and b) the elemental additive A to produce the homogeneous powder comprises homogeneously distributing the rare earth material R and the elemental additive A within the demagnetized magnetic material; and
sintering and magnetizing the homogenous powder to form the recycled Nd—Fe—B magnetic product comprises forming the recycled Nd—Fe—B magnetic product having a composition substantially of $W_aR_bA_c$ with a concentration of the rare earth material R and a concentration of the elemental additive A that increases, on average, surrounding a primary $Nd_2Fe_{14}B$ phase within the recycled Nd—Fe—B magnetic product, where W comprises Nd—Fe—B material from the waste magnetic assembly and indices a, b, and c comprise atomic percentages of the corresponding compositions or elements.

22. The method of claim 21 wherein forming the recycled Nd—Fe—B magnetic product comprises modifying an elemental concentration and an elemental composition of a grain boundary phase, on average, at a plurality of grain boundary regions that extend throughout the recycled Nd—Fe—B magnetic product by:
  forming $NdPrH_3$ from $H_2$ processing gas and the rare earth material R; and
  during sintering, transforming the $NdPrH_3$ to oxygen free NdPr.

23. The method of claim 1, wherein:
  sintering and magnetizing the homogenous powder to form the recycled Nd—Fe—B magnetic product comprises sintering and magnetizing the homogenous powder to form the recycled Nd—Fe—B magnetic product having a composition substantially of $W_a R_b A_c$, where W comprises Nd—Fe—B material from the waste magnetic assembly;
  indices a, b, and c comprise atomic percentages of the corresponding compositions or elements;
  a(t) is the atomic percent of element t in the waste material W;
  b(t) is the atomic percent of element t in the rare earth containing material R;
  c(t) is the atomic percent of element t in the elemental additives A; and
  a, b, c, a(t), b(t), and c(t) have values satisfying:
    81 at. % ≤ a ≤ 99.9 at. %,
    0.1 at. % ≤ b ≤ 1 at. %,
    3 at. %–99.9 at. %*a(Co) ≤ c(Co) ≤ 3 at. %–81 at. %*a(Co),
    0.3 at. %–99.9 at. %*a(Cu) ≤ c(Cu) ≤ 0.3 at. %–81 at. %*a(Cu),
    77 at. %–99.9 at. %*(a(Fe)+a(Co)) ≤ c(Fe) ≤ 77 at. %–81 at. %*(a(Fe)+a(Co)),
    a(Nd)+b(Nd)+a(Pr)+b(Pr) > 0 at. %,
    a(Nd)+b(Nd)+a(Pr)+b(Pr)+a(Dy)+b(Dy)+c(Dy) ≤ 18 at. %,
    a(Co)+b(Co)+c(Co) ≤ 3 at. %,
    a(Cu)+b(Cu)+c(Cu) ≤ 0.3 at. %,
    a(Fe)+b(Fe)+c(Fe)+a(Co)+b(Co)+c(Co) ≤ 77 at. %, and
    b(Nd)+b(Pr)+b(Dy)+c(Dy) ≥ 0 at. %.

24. The method of claim 1, wherein sintering and magnetizing the homogenous powder to form the recycled Nd—Fe—B magnetic product comprises sintering and magnetizing the homogenous powder to form the recycled Nd—Fe—B magnetic product having a composition substantially of $W_a R_b A_c$, where W comprises Nd—Fe—B material from the waste magnetic assembly and indices a, b, and c comprise atomic percentages of the corresponding compositions or elements and the rare earth material R and the elemental additive A satisfy:

$$Nd[0.1-1 \text{ at. }\%*s(Nd), x],$$

$$Pr[0.1-1 \text{ at. }\%*s(Pr), y],$$

$$Dy[0.1-19 \text{ at. }\%*s(Dy), z],$$

$$Co[0 \text{ at. }\%, d],$$

$$Cu[0 \text{ at. }\%, e],$$

$$Fe[0 \text{ at. }\%, f],$$

wherein:
  [m, n] means a range from a first value in a minimum interval m and a second value in a maximum interval n;
  s(t) is the atomic percent of element t in starting composition;
  x = 18 at. %–[99, 99.9] at. % *(s(Nd)+s(Pr)+s(Dy));
  y = 18 at. %–[99, 99.9] at. % *(s(Nd)+s(Pr)+s(Dy));
  z = 18 at. %–[81, 99.9] at. %*(s(Nd)+s(Pr)+s(Dy));
  d = 3 at. %–[81, 99.9] at. %*s(Co);
  e = 0.3 at. %–[81, 99.9] at. %*s(Cu); and
  f = 77 at. %–[81, 99.9] at. %*(s(Fe)+s(Co)).

25. The method of claim 1 wherein demagnetizing the magnetic material from the waste magnet assembly by cyclic heating and cooling of the magnetic material comprises demagnetizing a waste magnet part, that comprises the magnetic material, from the waste magnet assembly to fragment the adhesives that bond the waste magnet part to a non-magnet part and to crack at least one coating layer selected from: an electrolytic black Epoxy, a Ni, a Ni—Cu, a Ni—Ni, a Ni—Cu—Ni, or a Zn coating layer of the waste magnet part.

26. The method of claim 25 wherein the cyclic heating and cooling comprises:
  heating the magnetic material to a Curie temperature of the rare earth material R; and
  cooling, after heating to the Curie temperature of the rare earth material R, the magnetic material at a rate of at least 100° C./sec.

27. The method of claim 1, wherein sintering and magnetizing the homogenous powder to form the recycled Nd—Fe—B magnetic product that comprises 1.98 at. % oxygen or less comprises sintering and magnetizing the homogenous powder to form the recycled Nd—Fe—B magnetic product that comprises between 1.32 to 1.98 at. % oxygen.

* * * * *

UNITED STATES PATENT AND TRADEMARK OFFICE
CERTIFICATE OF CORRECTION

PATENT NO. : 9,044,834 B2  
APPLICATION NO. : 14/307267  
DATED : June 2, 2015  
INVENTOR(S) : Miha Zakotnik et al.

Page 1 of 1

It is certified that error appears in the above-identified patent and that said Letters Patent is hereby corrected as shown below:

In the Claims

Column 36, line 50 (Claim 1, line 4), change "And" to --and--;

Column 36, line 56 (Claim 1, line 10), change "material without impurities;" to --material;--;

Column 36, lines 62-63 (Claim 1, lines 16 and 17), change "at least one of:" to --both:--;

Column 36, line 63 (Claim 1, line 17), change "or" to --and--; and

Column 36, line 65 (Claim 1, line 19), after "Cu," insert --and--.

Signed and Sealed this
Tenth Day of November, 2015

Michelle K. Lee
*Director of the United States Patent and Trademark Office*